July 21, 1931.  O. MALCHER  1,815,310
REGISTERING SCALE
Filed Nov. 4, 1921    12 Sheets-Sheet 1
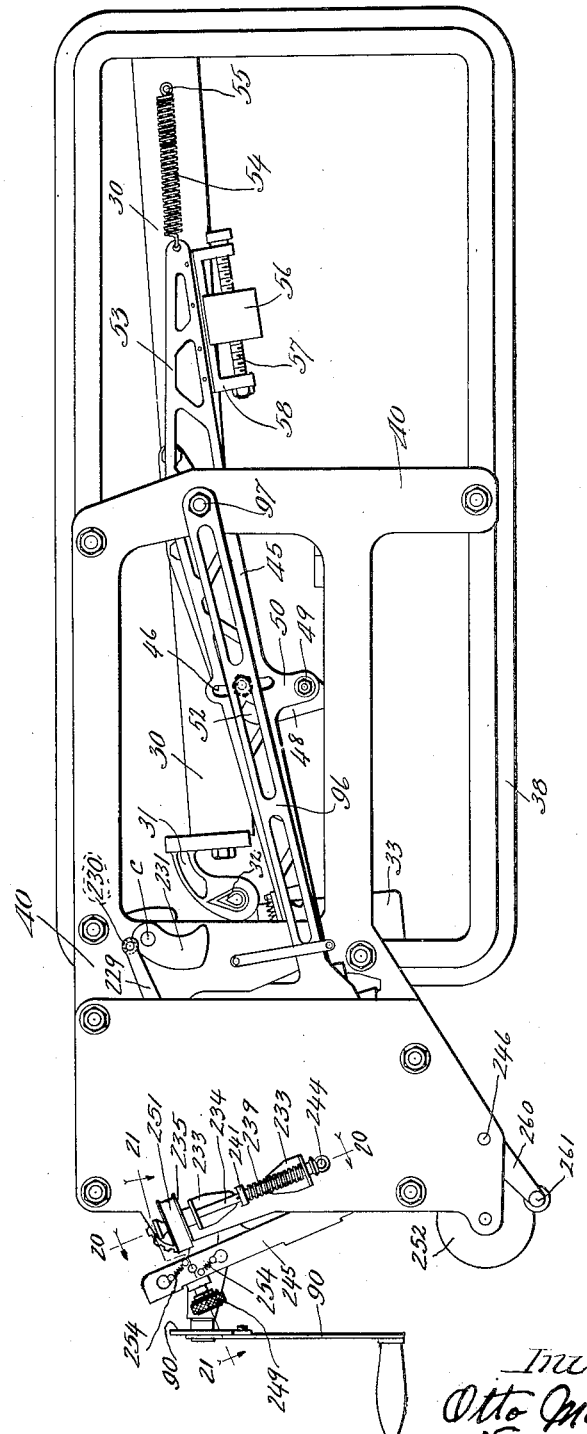
Fig.1
Inventor
Otto Malcher
By Nissen & Crane
Attys.

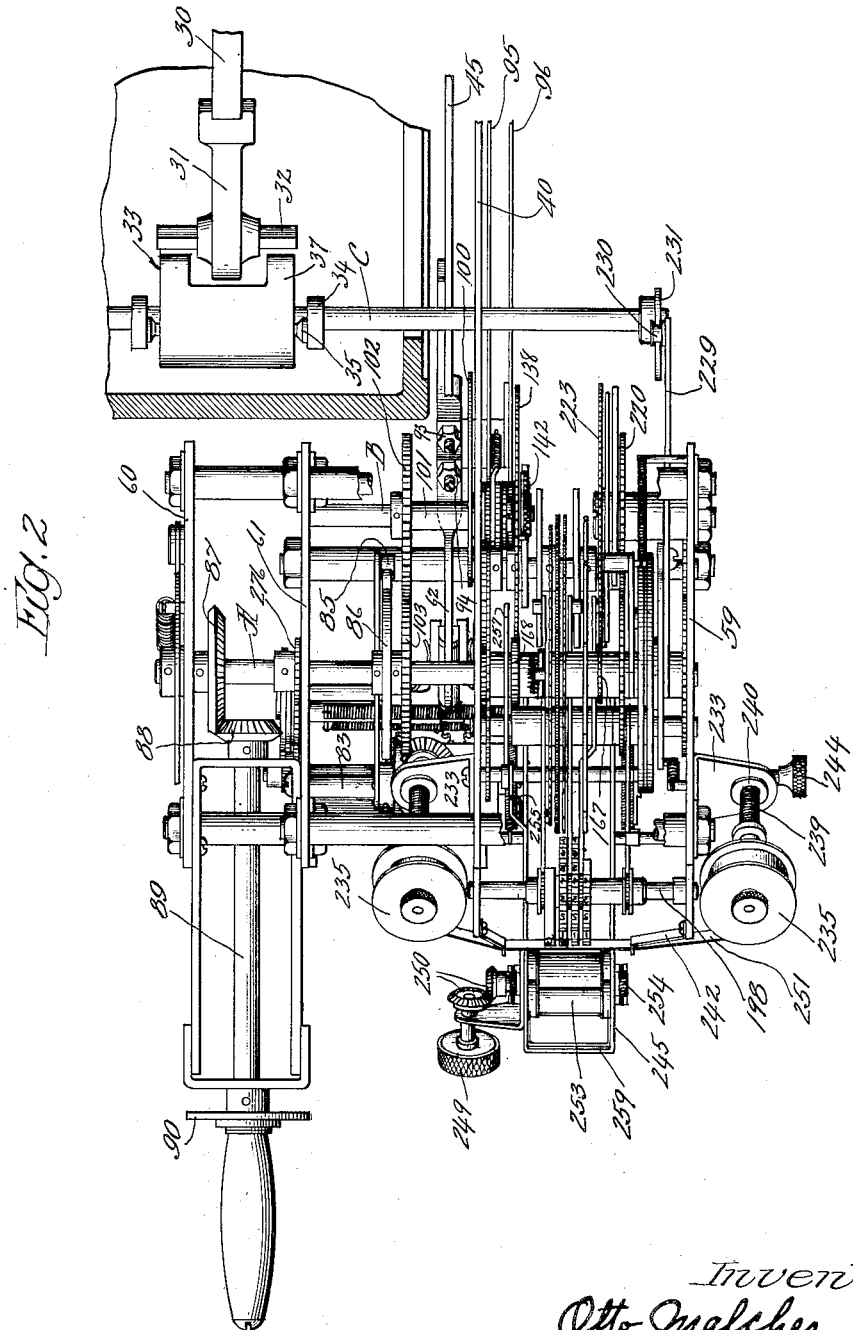

July 21, 1931. O. MALCHER 1,815,310
REGISTERING SCALE
Filed Nov. 4, 1921 12 Sheets-Sheet 3
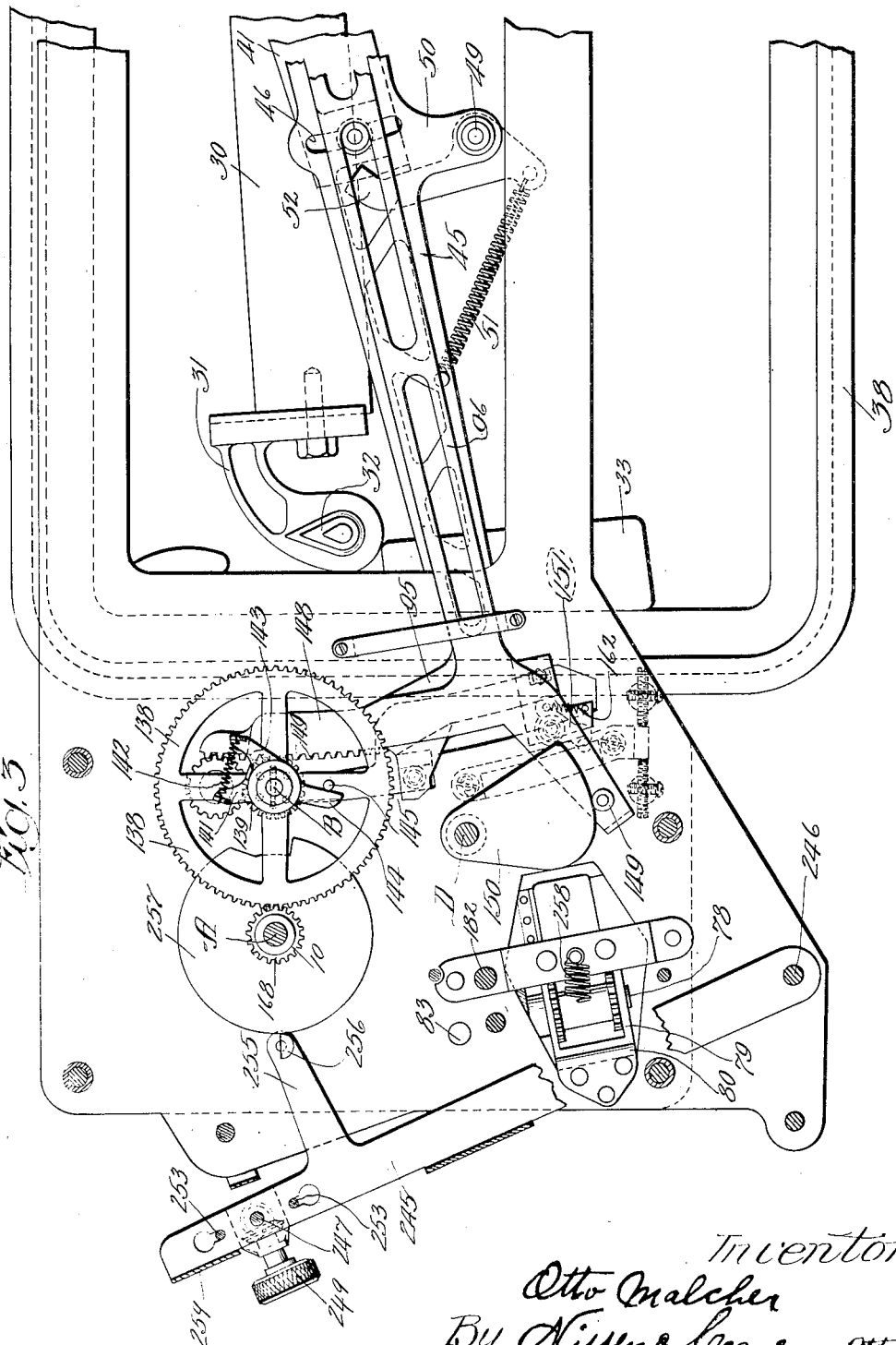

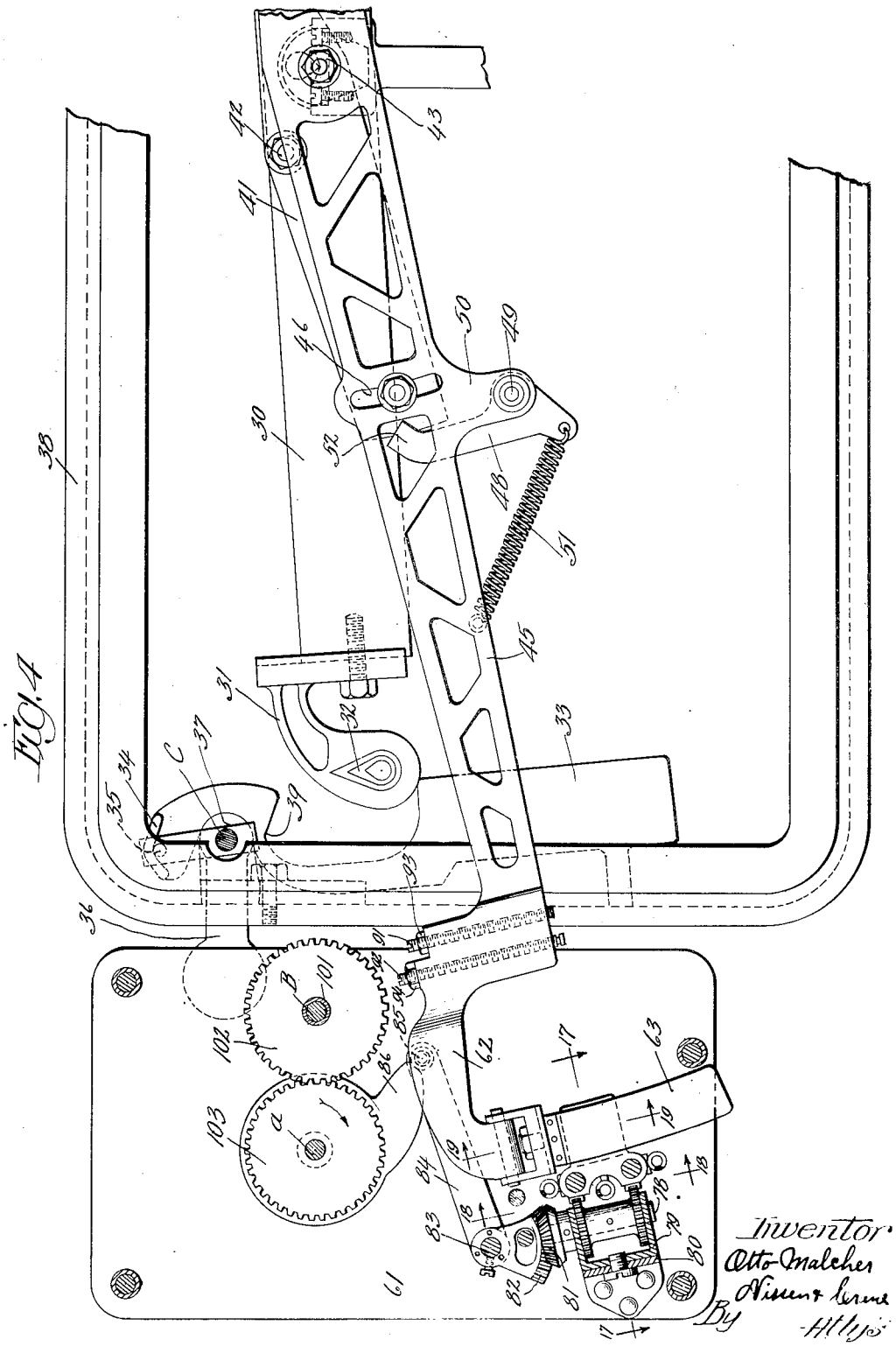

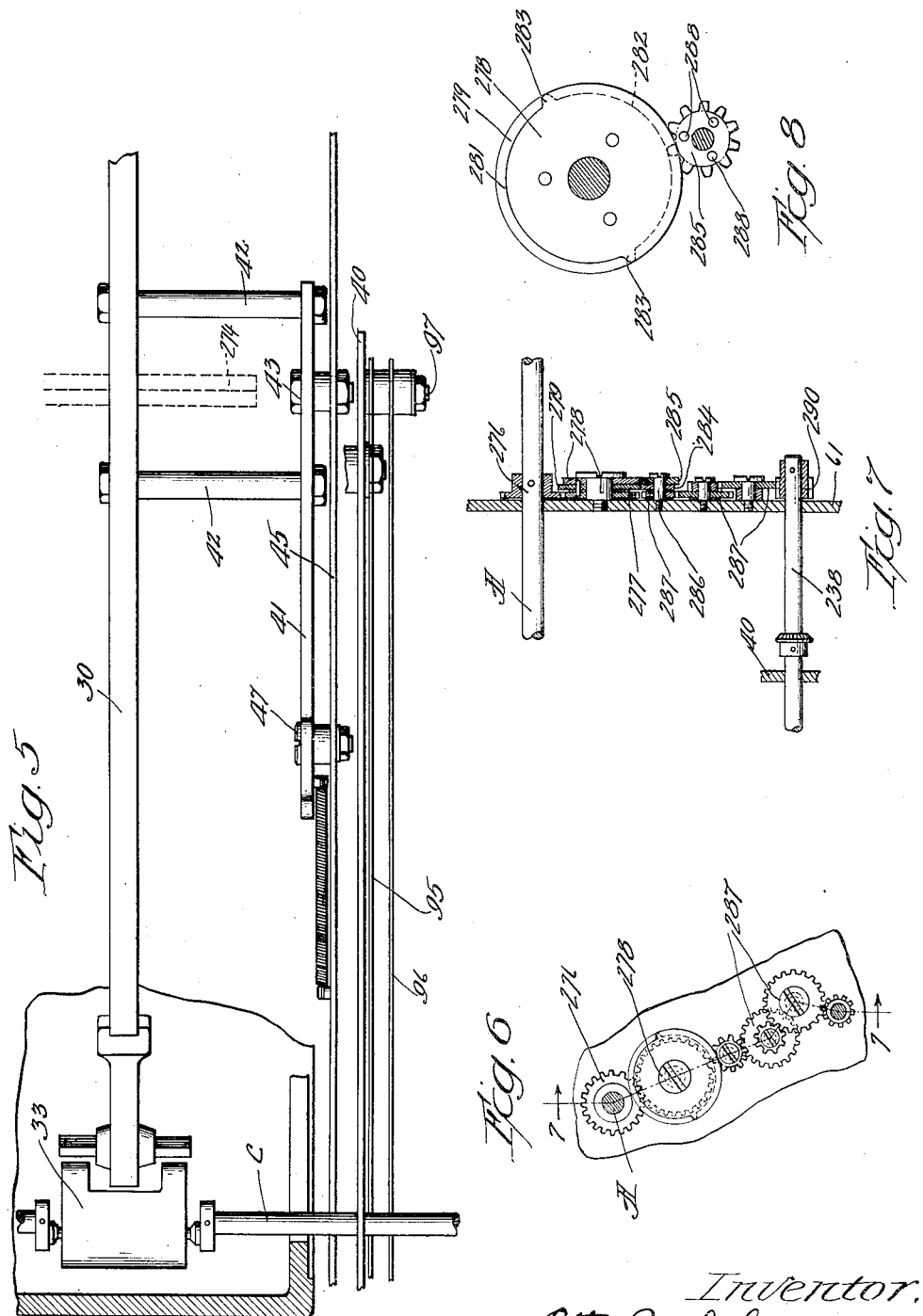

July 21, 1931.  O. MALCHER  1,815,310

REGISTERING SCALE

Filed Nov. 4, 1921  12 Sheets-Sheet 6

Inventor
Otto Malcher
By Nissen & Crane Attys

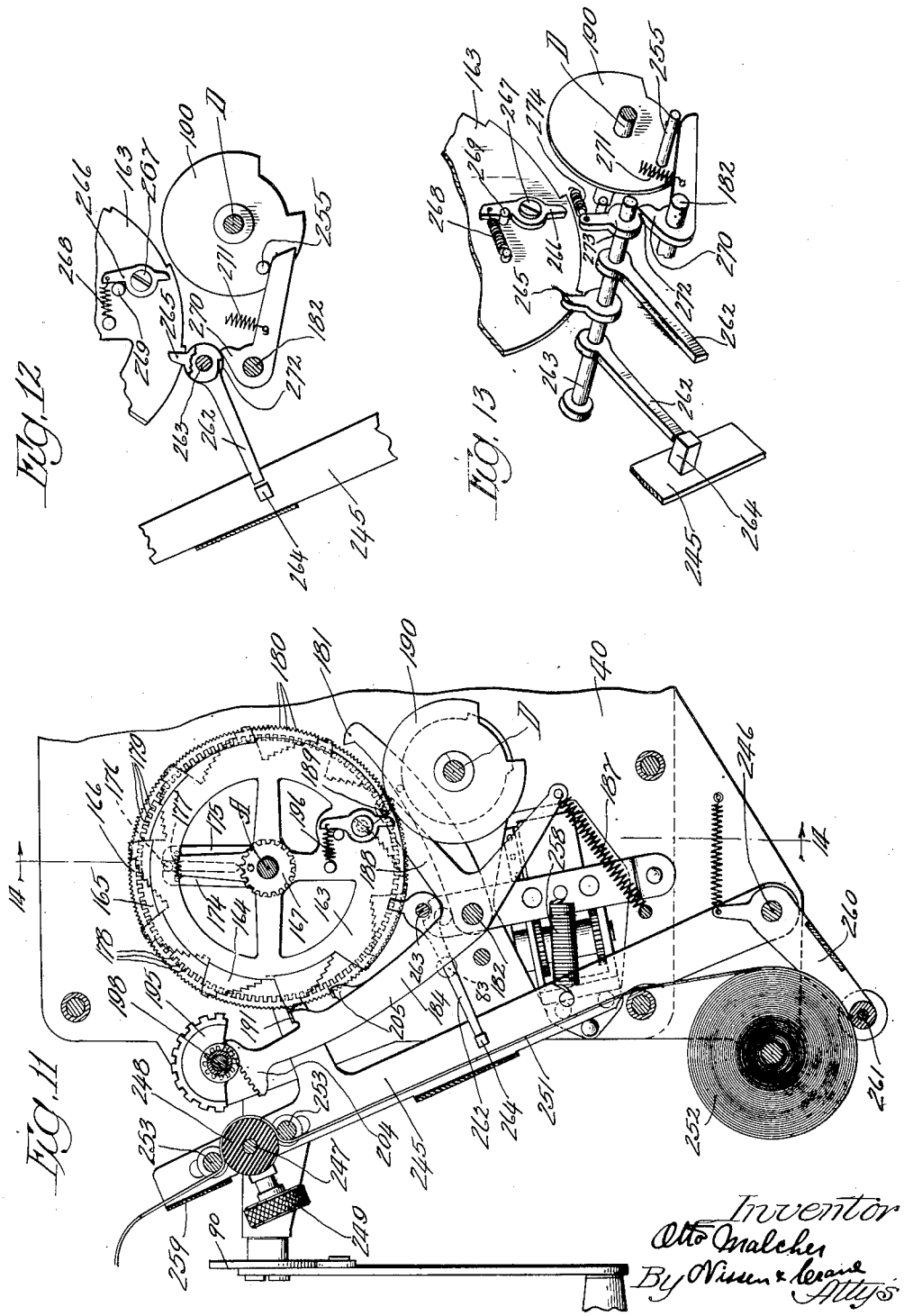

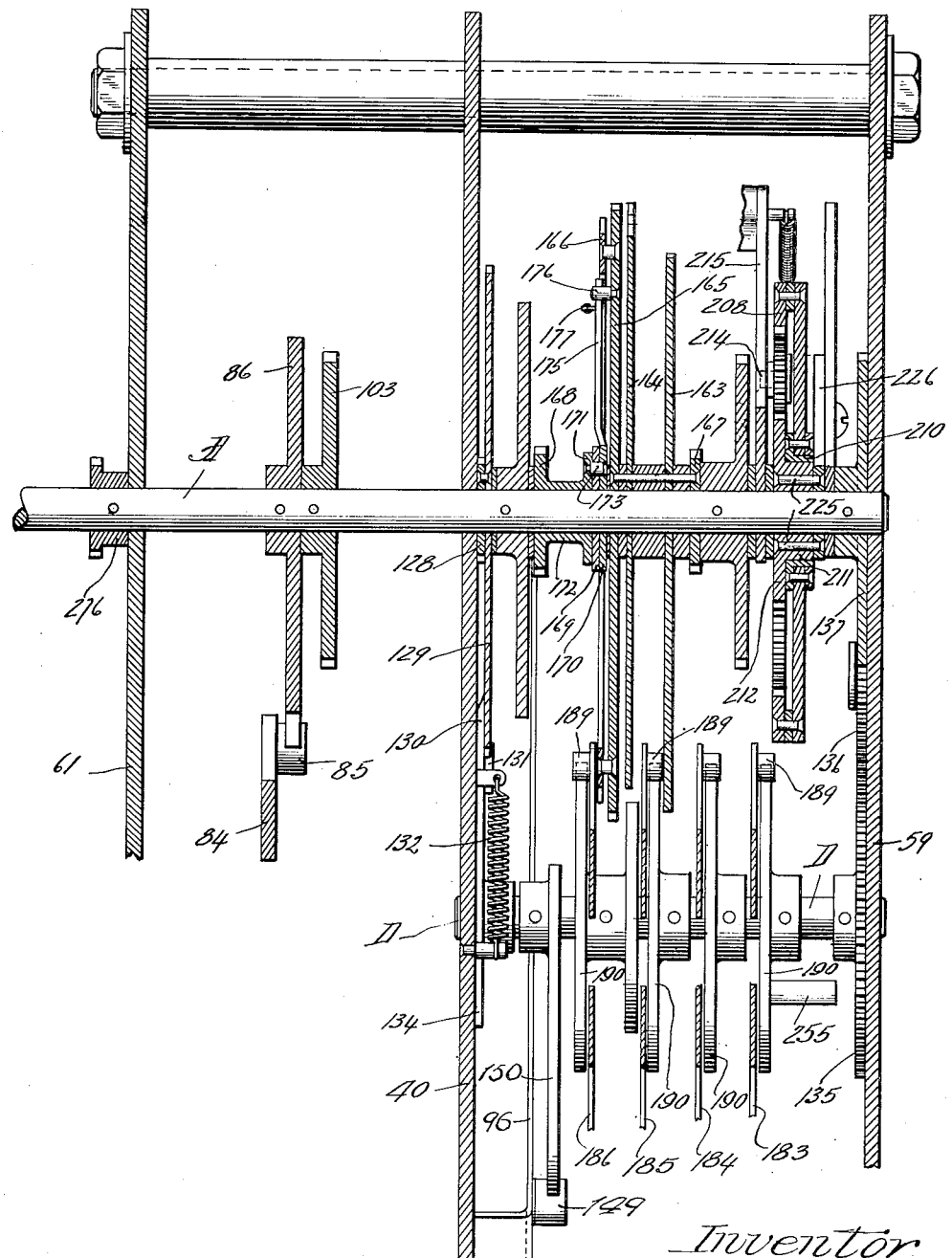

July 21, 1931.   O. MALCHER   1,815,310
REGISTERING SCALE
Filed Nov. 4, 1921   12 Sheets-Sheet 9

Inventor:-
Otto Malcher
By Nissen & Crane Atty's

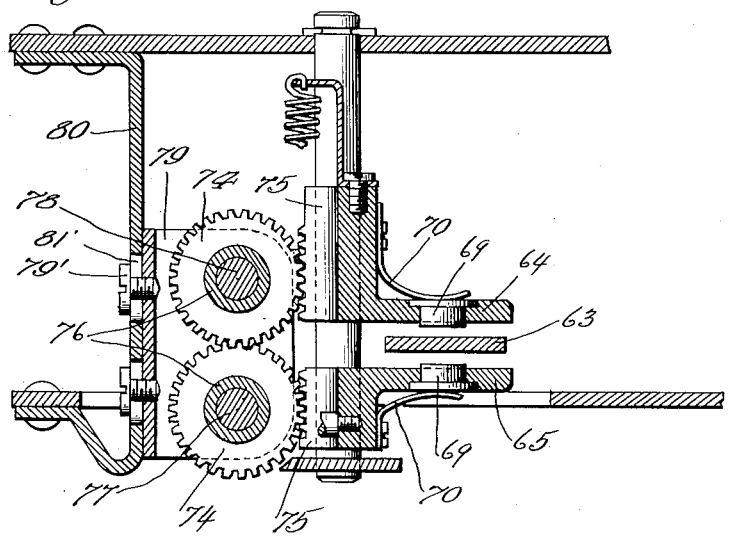
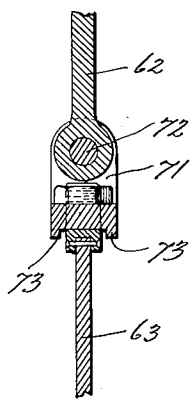
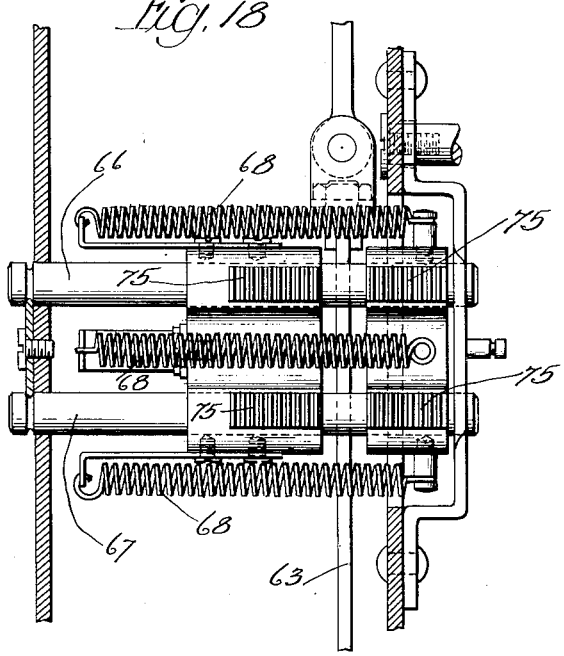

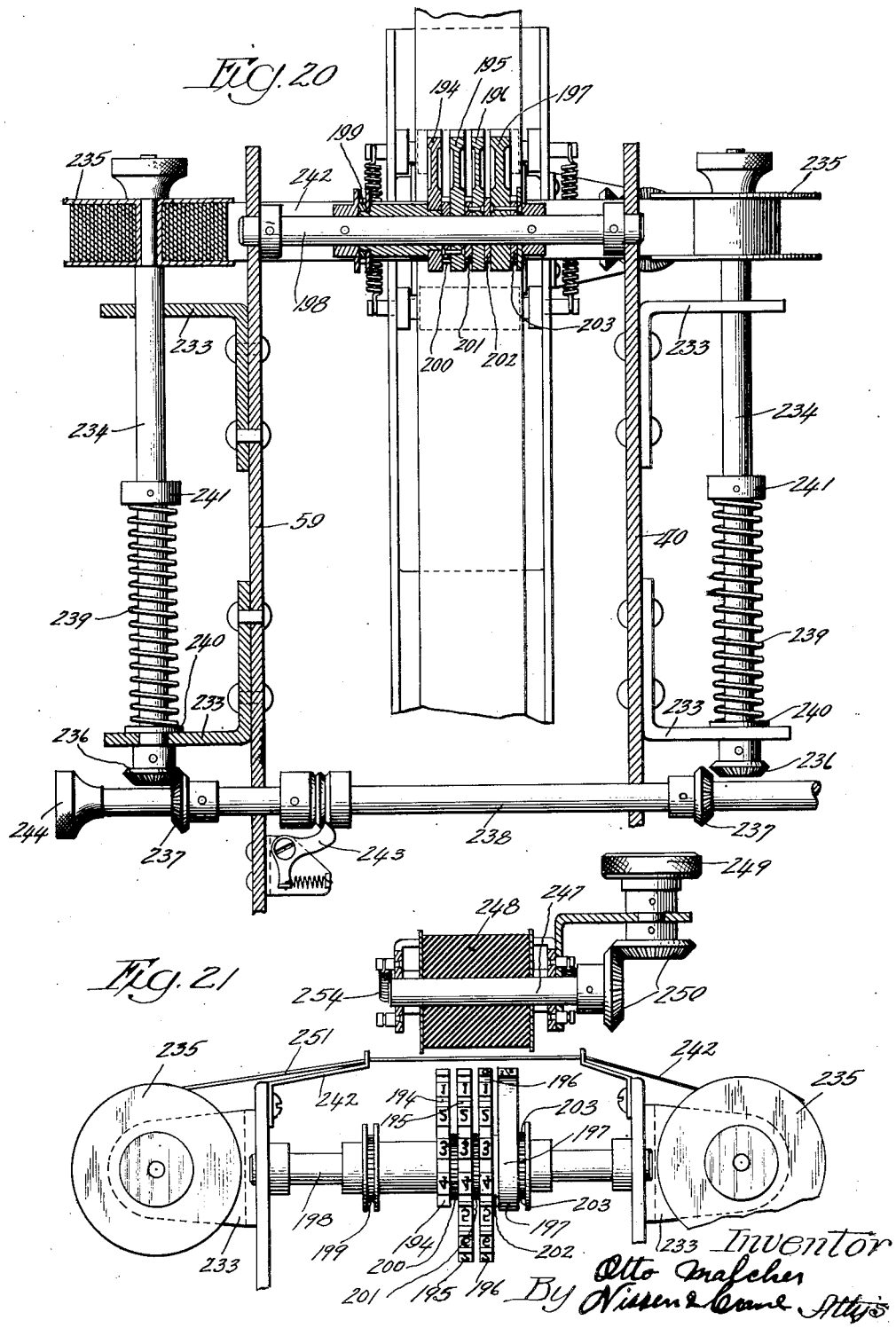

July 21, 1931. O. MALCHER 1,815,310
REGISTERING SCALE
Filed Nov. 4, 1921 12 Sheets-Sheet 12
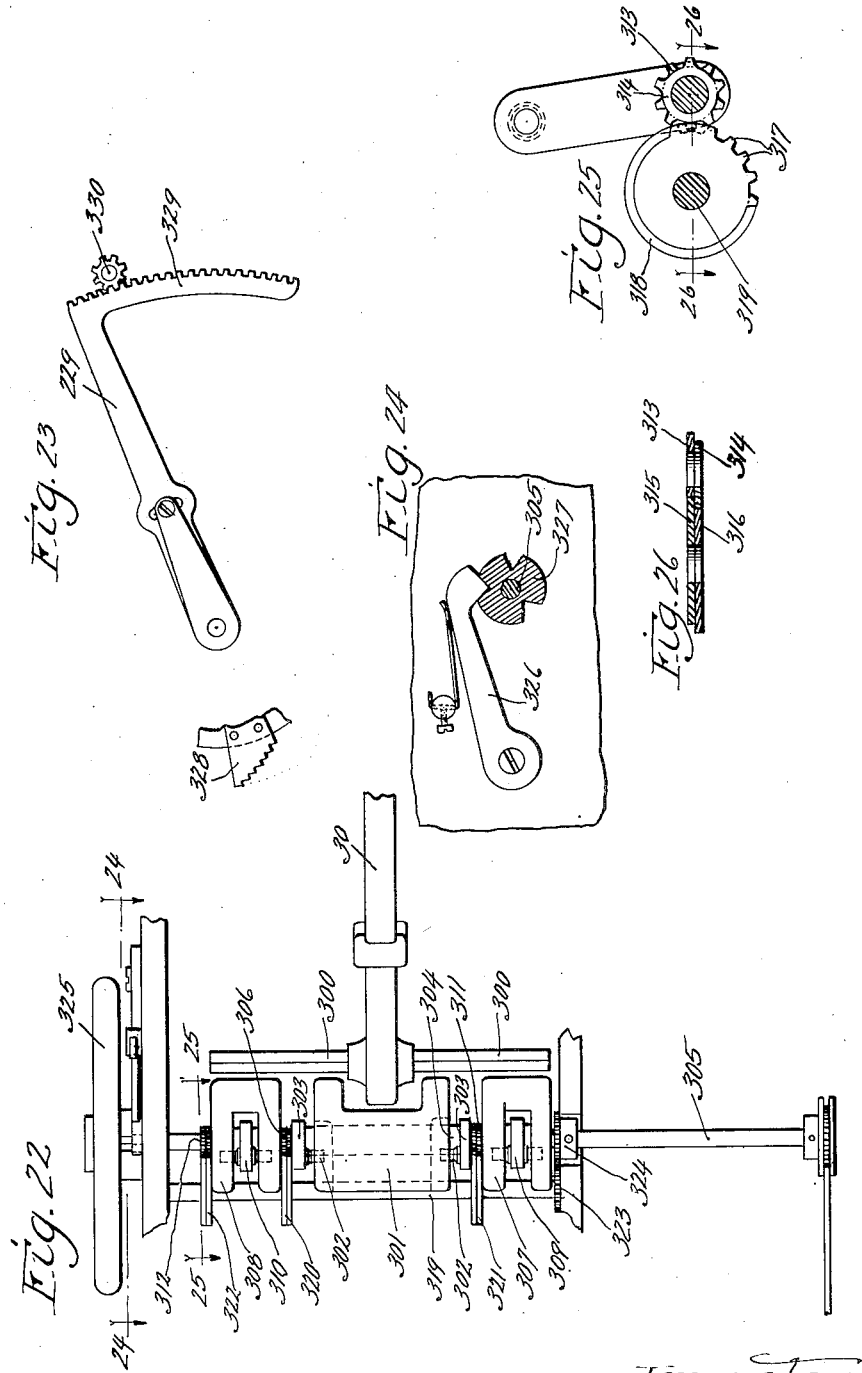

Patented July 21, 1931

1,815,310

UNITED STATES PATENT OFFICE

OTTO MALCHER, OF CHICAGO, ILLINOIS

REGISTERING SCALE

Application filed November 4, 1921. Serial No. 512,784.

This invention relates to mechanism for registering the weights ascertained by a weighing scale, and is especially adapted to beam scales, although it is not confined to scales of this nature.

The invention has for its object the provision of mechanism of the class named which shall be of improved construction and operation. It is exemplified in the combination and arrangement of parts shown in the accompanying drawings and described in the following specification, and is more particularly pointed out in the appended claims.

In the drawings—

Fig. 1 is a front elevation of a portion of a scale frame showing one embodiment of the present invention applied thereto;

Fig. 2 is a horizontal section through a portion of the frame shown in Fig. 1 and illustrates the weight recording mechanism in top plan view, with parts broken away;

Fig. 3 is a view similar to Fig. 1, but on a somewhat larger scale and having a portion of the casing frame removed;

Fig. 4 is a vertical sectional view showing the beam locking mechanism;

Fig. 5 is a top plan view of a portion of a scale beam and parts attached thereto;

Figs. 6, 7 and 8 are fragmentary views showing details of construction, Fig. 7 being a section substantially on line 7—7 of Fig. 6;

Fig. 11 is a vertical section of the registering mechanism showing the stepped wheels and associated parts;

Fig. 12 is an enlarged view showing details of a portion of the mechanism illustrated in Fig. 11;

Fig. 13 is a perspective view of the mechanism shown in Fig. 12;

Fig. 14 is a vertical section substantially on line 14—14 of Fig. 11, with parts omitted;

Fig. 15 is a fragmentary elevation showing the drop weight controlled means for inserting quantities in the registered amount;

Fig. 16 is a fragmentary detail of an adjustable compensating stop;

Fig. 17 is a section substantially on line 17—17 of Fig. 4;

Fig. 18 is a section substantially on line 18—18 of Fig. 4;

Fig. 19 is a section on line 19—19 of Fig. 4;

Fig. 20 is a section on line 20—20 of Fig. 1;

Fig. 21 is a section on line 21—21 of Fig. 1;

Fig. 22 is a fragmentary top plan view of a modified form of the invention by which a plurality of weights may be deposited upon the scale beam instead of a single weight, as provided for in the form previously described;

Fig. 23 is a fragmentary elevation of a detail of the mechanism shown in Fig. 22;

Fig. 24 is a section on line 24—24 of Fig. 22;

Fig. 25 is a section on line 25—25 of Fig. 22; and

Fig. 26 is a section on line 26—26 of Fig. 25.

Figures 9, 10:
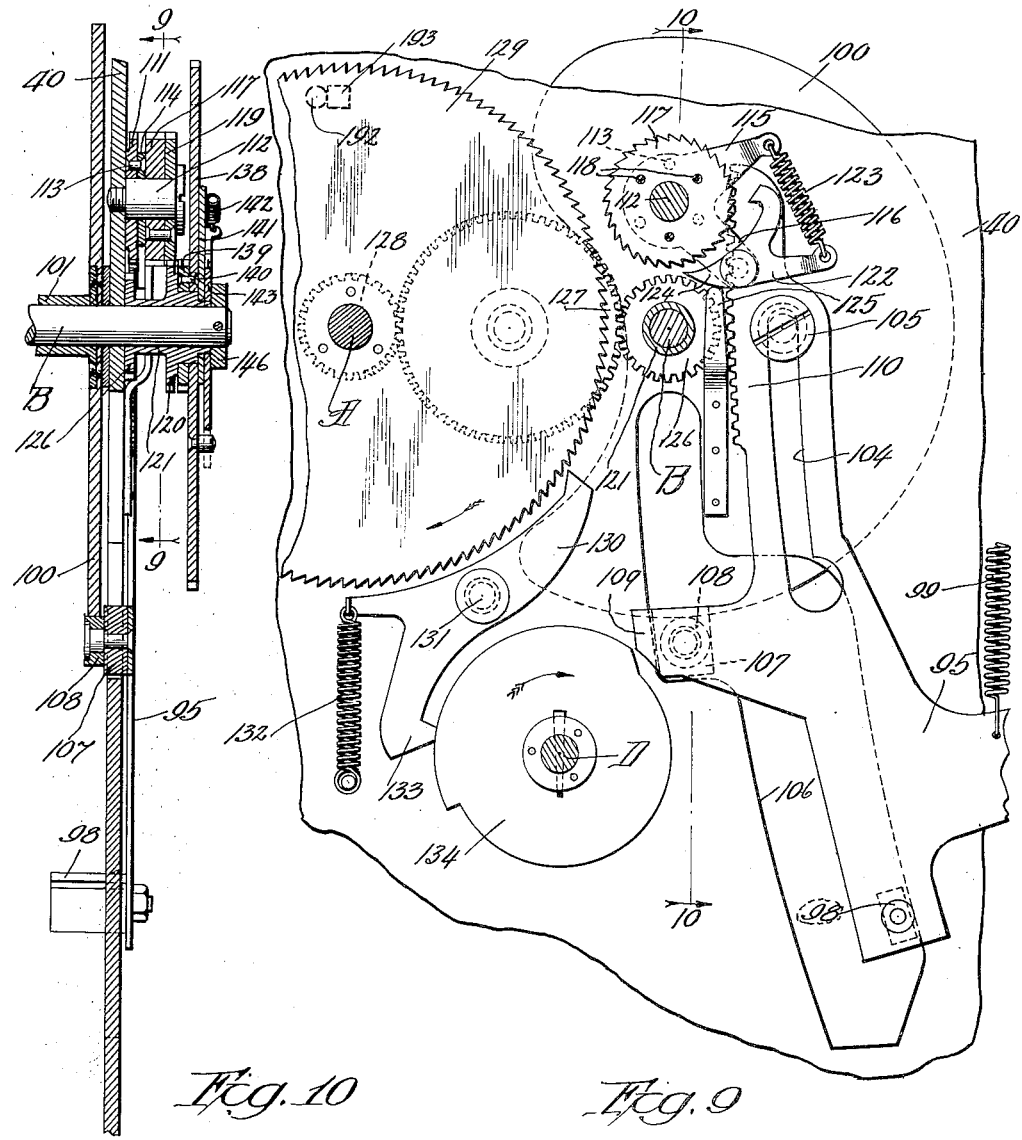
Fig. 9 is a fragmentary elevation of a portion of the beam controlled driving mechanism.
Fig. 10 is a section substantially on line 10—10 of Fig. 9.

The embodiment of the invention illustrated in the drawings is represented as being applied to a weighing scale of the well-known type in which a beam 30 is arranged to move upwardly an amount proportional to the weight of a commodity placed upon the scale platform. In scales of this type it is usual to have a dial provided with a pointer, the pointer being connected with the scale beam to indicate the weight of the commodity. It is also common in scales of this type to provide one or more "drop weights" which may be placed upon the scale beam to increase the capacity of the scale. The arrangement is such that when the beam has moved upwardly an amount to cause the pointer to traverse the complete range of graduations on the dial, a weight may be imposed upon the beam which will counterbalance the weight on the platform corresponding to the maximum reading of the dial. Such weight depositing apparatus is shown in Fig. 4 of the drawings.

The beam 30 is provided at its end with a bracket 31 having a weight carrier 32. A weight 33 is supported by a projection 34 which engages a pin 35 on a weighted bell crank 36, the bell crank being pivoted at 37 on the frame 38 of the scale. When the weighted arm 36 is thrown over until its center of gravity passes the vertical plane of the pivot 37 the weight 33 will be dislodged from the pin 35 and will engage the support 32 at the notched portion 39 of the weight. The supporting pin 37 for weighted arm 36 is made to rotate with the arm when the weight is deposited for purposes which will appear hereinafter.

The weight registering mechanism for the scale is supported upon a frame plate 40, Fig. 1, and the mechanism is controlled by an extension movably attached to the beam 30. The manner of securing the extension to the beam 30 is best shown in Figs. 1, 3, 4 and 5. A plate or bar 41 is rigidly attached to the scale beam 30 by spacing bolts 42. The bar 41 carries a pivot bolt 43 having the axis thereof in alinement with the knife edge 44 of the scale beam. An extension arm 45 is pivotally mounted on the bolt 43 and is provided with an arcuate slot 46 through which a guide bolt 47 carried by the bar 41 extends. A dog 48 is pivotally mounted at 49 on a downwardly extending projection 50 carried by the extension 45. A spring 51 normally presses the nose 52 of the dog 48 into a notch in the end of the bar 41. This dog movably retains the extension 45 in substantial alinement with the bar 41. The extension 45 is provided wth a tail-piece 53 having one end of a spring 54 secured thereto, the other end of the spring being attached at 55 to the scale beam 30. When the extension 45 is displaced on its pivot bolt 43 the spring 54 tends to return the extension to central position, in which position it is automatically latched by the dog 48.

A weight 56 is adjustably supported by a screw 57 on a bracket 58 carried by the tail-piece 53. The weight 56 may be shifted on its support to accurately counterbalance the bar 41 and the parts connected therewith so that the attachments to the scale beam 30 do not affect the balance of the scale.

*Extension beam lock*

The extension 45 of the scale beam 30 will move in unison with the beam an amount proportional to the weight on the scale platform and mechanism is provided for locking the extension in the position to which it is moved by the load so that in its locked position it may constitute a fixed stop for controlling the registering mechanism. In this way the only part moved by the scale beam is the extension 45 and the support therefor. This extension being accurately counterbalanced, places no burden upon the weighing mechanism. When the extension has once been locked the load may be removed from the platform, if desired, and the scale beam 30 can move independently of the extension because of the fact that the latch 51 is spring-held and will yield to pressure, tending to move the extension and beam relative to one another. As soon as the extension is released it will automatically return to its normal position relative to the scale beam.

The mechanism for locking the extension in the positions to which it is moved by the scale beam is shown in Figs. 4, 17, 18 and 19. As shown in Fig. 2, the main frame plate 40 supports a front plate 59, a back plate 60, and an intermediate plate 61. These plates are suitably connected to one another and spaced apart by stay-bolts and sleeves, as shown in the drawings. The beam extension 45 is arranged in the rear of the frame plate 40 and carries a bracket 62 from which is suspended a grip bar 63. The bar 63 moves between a pair of jaws 64 and 65, Fig. 17. These jaws are mounted to slide on guide rods 66 and 67, as shown in Fig. 18, and are provided with springs 68 tending to close the jaws upon the bar 63. Each jaw may be provided with a friction member 69 of fiber, or other suitable material, to assist the jaws in securing a firm hold upon the bar 63. The members 69 are preferably pressed inwardly by springs shown at 70. The bar 63 is connected with the bracket 62 by a doubly pivoted coupling 71, shown in Figs. 18 and 19. This coupling permits limited axial rotation of the bar 63 and also lateral movement about the pivotal support 72. No longitudinal movement of the bar relative to the bracket is permitted, however. The axial rotation of the bar 63 is limited by downwardly projecting ribs 73 on the yoke of the coupling 71. The coupling provides for any slight movement of the bar necessary for its adjustment to the jaws 64 and 65 when they close upon it. If the bar and yoke were rigidly connected any strain or twist imparted to the bar by the clamping jaws would be transmitted through the extension 45 to the beam 30 and might affect the scale reading to a slight extent.

The jaws 64 and 65 are controlled by gears 74 which mesh with racks 75 formed on the supports for the jaws. Each jaw is provided with a pair of racks which mesh with a corresponding pair of gears, the gears for each jaw being connected by a sleeve 76. The two sleeves 76 are fixed to shafts 77 and 78, respectively, the shafts being journaled in a channel member 79 which is supported by a bracket 80 attached to the frame plates 40 and 61. The two pairs of gears 75 intermesh with one another so that the jaws 64 and 65 will move in unison, and the shaft 78 is provided with a beveled pinion 81 meshing with a gear segment 82 fixed to a shaft 83. An arm 84 is rigidly connected with the gear segment 82 and carries at its end a roller 85 disposed in the path of a cam 86 secured to the main drive shaft A of the registering mechanism.

The shaft A is journaled in the frame plates 40, 59, 60 and 61 and carries a beveled gear 87 by which it is rotated. The beveled gear 87 meshes with a pinion 88 on a crank shaft 89, the shaft 89 being provided with a handle 90, or other suitable driving mechanism. When a weight has been placed on the platform of the scale and the beam 30 has come to rest, the handle 90 is rotated to drive the registering mechanism. The first effect of the rotation will be to move the cam 86 to release the roller 85 and permit the jaws 64 and 65 to clamp the bar 63, thus locking the beam extension 45 against further movement until it is released by the jaws.

Register drive

As shown in Fig. 4, the beam extension 45 carries a pair of stop screws 91 and 92 which are threaded through the bracket 62 and are provided with lock nuts 93 and 94, respectively. The lower ends of these screws form stops for the register drive and limit the movement of the drive to amounts proportional to the movement of the scale beam.

The register drive comprises a pair of arms 95 and 96 which may be designated an actuator arm and a follower arm, respectively. Both of these arms are pivotally mounted on a stud 97 carried by the frame plate 40 and arranged in axial alinement with the knife edge 44 of the scale beam, as shown in Figs. 1 and 5. The end of the actuator arm 95 is shaped as shown in Fig. 9, and is provided with a stop 98 positioned in alinement with the lower end of the screw 91 on the beam extension 45. A spring 99 normally tends to draw the arm 95 upwardly, the arm being held against the tension of the spring by a cam 100 fixed to a sleeve 101 which is rotatably mounted on a shaft B supported by the frame plates 40 and 61. Fixed to the sleeve 101 is a gear 102 which meshes with an equal-sized gear 103 on the main drive shaft A, as shown in Fig. 2. Rotation of the drive shaft A will move the cam 100 in a counterclockwise direction, as viewed in Fig. 9, and will release the arm 95 to move upwardly under the tension of the spring 99 immediately after the operation of the clamping jaws 64 and 65. The upward movement of the arm 95 will be limited by the stop screw 91, the screw being set to permit a movement of the actuator arm an amount somewhat greater than the movement of the beam extension 45. The arm 95 is guided in its upward movement by a slot 104 through which a screw 105 extends, the screw being fastened to the frame plate 40.

An opening 106 is provided in the frame plate 40 through which a block 107 extends to support a roller 108 in alinement with the cam 100. Projections 109 on the arm 95 engage the opposite faces of the plate 40 to assist in guiding the arm in its upward movement. A rack segment 110 is supported on the arm 95 and meshes with a pinion 111 journaled on a stud 112 supported by the frame plate 40, as shown in Fig. 10. Connected with the pinion 111 by rivets 113 is a plate 114 having arms 115 and 116 formed thereon. Also, journaled on the stud 112 is a ratchet wheel 117 connected by rivets 118 to a pinion 119. The pinion 119 meshes with a pinion 120 formed on a sleeve 121 which is journaled on the end of the shaft B which projects through the frame plate 40.

A dog 122 is pivoted on the end of the arm 116 and a spring 123 connects the dog 122 with the arm 115, tending to draw the nose of the dog into engagement with the teeth of the ratchet wheel 117. The dog 122 is provided with a tail-piece 124 which engages a stop 125 on the frame plate 40 when the actuator arm 95 is in its lowermost position holding the arm 116 in the position shown in Fig. 9. As soon as the arm 95 begins to move upwardly the dog 122 will be released and will travel over the teeth of the ratchet 117. The dog will engage the teeth of the ratchet and prevent re-bound of the arm when the stop 98 strikes the stop screw 91.

The cam 100 is so shaped that almost immediately after the arm 95 has reached its uppermost position the face of the cam will again begin to bear upon the roller 108 and press the arm 95 downwardly. By the time the cam has made approximately a half revolution, the arm will be again in its lowermost position, where it will remain during the second half of the revolution of the cam. The downward movement of the arm 95 will return the dog 122 in a clockwise direction, as viewed in Fig. 9, to the position shown in that figure, and since the dog will be in contact with the ratchet wheel 117 during this return movement, the ratchet wheel will also be rotated in a clockwise direction, as viewed in that figure. Since the ratchet wheel is fixed to the gear 119, which in turn meshes with the gear 120, the return movement of the arm 95 driven by the cam 100 will positively rotate the sleeve 121 on the shaft B.

The sleeve 121 has a gear 126 fixed thereto which meshes with an idler 127 arranged to drive a pinion 128 loosely mounted on the shaft A. The pinion 128 has a large ratchet wheel 129 fixed thereto, the teeth of which are engaged by a dog 130 pivoted at 131 on the frame plate 40. A spring 132 normally presses the nose of the dog 130 into engagement with the ratchet wheel 129, thus holding the ratchet wheel and the sleeve 121 geared thereto against reverse movement when the arm 95 reaches its lowermost position and the dog 122 is disengaged from the ratchet wheel 117.

The dog 130 is provided with a tail-piece 133 which engages a cam 134 on a cam shaft D. This cam shaft D is driven by a gear 135, Fig. 14, which is connected through an idler 136 with a gear 137 on the main drive shaft A. The cam shaft D is rotated in a clockwise direction, as viewed in Fig. 9, by the drive shaft A and moves a sufficient amount to release the dog 130 by the time the arm 95 begins its downward movement.

Journaled to rotate on the sleeve 121, as shown in Figs. 3 and 10, is a gear wheel 138 having a pinion 139 fixed thereto by rivets 140. Rigidly attached to the sleeve 121 adjacent the front face of the gear 138 is a plate 141 having an outwardly extending arm to which one end of a spring 142 is attached. Freely rotatable on the sleeve 121 adjacent the plate 141 is a second plate 143 having an outwardly extending arm to which the other end of the spring 142 is attached, as shown in Fig. 3. The plate 143 is provided with a second arm 144 which is drawn by the spring 142 against a pin 145 carried by the gear 138. A collar 146 is secured to the outer end of the shaft B to retain in place the parts thereof. The pinion 139 meshes with rack teeth 147 formed on a gear segment 148 carried by the follower arm 96, as shown in Fig. 3.

The follower arm 96 is provided with a roller 149 which engages a cam 150 on the shaft D. Rotation of the shaft D disengages the cam from the roller 149 prior to the beginning of the downward movement of the actuator arm 95. When the arm 95 begins its downward movement, the sleeve 121 will be rotated, as previously explained, and will carry the plate 141 in a counter-clockwise direction, as viewed in Fig. 3. This movement will be transmitted through the spring 142 to the plate 143 and thence to the gear 138 through the arm 144 and pin 145. In this way a spring drive will be imparted to the gear 138 during the downward movement of the arm 95 under the influence of the cam 100. Since the gear 138 is connected through the pinion 139 to the rack segment 148 the rotation of the gear 138 will cause the rack segment 148 and the follower arm 96 to travel upwardly. The upward movement of the follower arm will be limited by a stop 151 carried by the arm 96 in position to engage the lower end of the stop screw 92 on the beam extension 45. The screw 92 is adjusted so as to limit the movement of the arm 96 to an amount equal to the movement of the beam extension 45, and since the actuator arm 95 is permitted a somewhat greater movement the stop 151 will engage the stop screw 92 before the actuator arm has reached the limit of its downward movement. When the upward movement of the follower arm is arrested the actuator arm will continue to move downwardly, thus rotating the sleeve 121 and the plate 141 attached thereto an additional amount after the gear 138 has been brought to rest by the limit stop on the follower arm 96. This additional movement of the plate 141 will stretch the spring 142 and place a tension upon the plate 143, resiliently drawing the follower arm into firm contact with its limit stop. Since the upward movement of the follower arm is produced by a positive drive operating through a spring connection there is no tendency for the follower arm to re-bound when it strikes its limit stop as would be the case if the upward movement were produced by a spring alone, and yet this arrangement makes it possible to hold the follower arm against its limit stop by spring tension at the end of its movement. Since the rotation of the wheel 138 is proportional to the movement of the follower arm and since the movement of this arm is limited by the stop screw 92 to an amount proportional to the movement of the scale beam, it is evident that the movement of the gear wheel 138 will also be proportional to the scale beam movement, and hence to the weight on the scale platform.

The gear wheel 138 drives the registering mechanism in a manner to be described, thus imparting to the registering mechanism a movement proportional to the weight on the scale platform. In order to adjust the register mechanism to compensate for slight variations in the amount of movement of the beams of different scales to which the register may be attached, it is desirable to provide for an adjustment of the actual amount of movement of the follower arm while maintaining the proportionality of this movement to that of the scale beam. This result is secured by a movable stop on the follower arm provided with an adjustable control, which is shown best in Fig. 16. The stop 151 is secured to the arm 96 by a pivot screw 152. The stop comprises a circular engaging member 153 forming one arm of the pivoted stop and a rounded control member 154 is carried by the other arm of the stop. The control member 154 engages a guide track 155 on a pivoted guide member 156. The member 156 is connected to the plate 40 by a pivot screw 157 and a lock screw 158. A slot 159 permits adjustment of the guide member about the pivot screw 157 by means of adjusting screws 160 which bear against opposite sides of the downwardly projecting end of the guide member. Set screws 161 are provided for locking the adjusting screws against movement and the guide member 151 may be further secured by the holding screw 158.

A spring 162 Fig. 3 normally draws the control member 154 against the guide 155. If the guide 155 is set so that it recedes from the path of the control member 154 as the arm 96 moves upwardly the contact member 153 will gradually be lowered and the arm will be given a larger amount of movement before the contact member reaches the stop bolt 92. If it is found that a particular scale beam with which the registering mechanism is connected has a slightly greater movement than that for which the mechanism is set, the guide member 156 may be adjusted so that its upper end will bear more closely to the pivotal support of the stop 151 as the stop moves upwardly. This will throw the engaging member 153 upwardly relative to the arm 96 so that the movement of the arm will be arrested sooner than would be the case if the upper end of the guide were set to diverge from the path of travel of the stop. By this arrangement the actual travel of the arm can be adjusted for variations in different scales while the proportionality of the amount of movement to the weight is maintained.

*Register mechanism*

The mechanism for registering the weight upon the scale platform in the particular embodiment of the invention illustrated in the drawings comprises a plurality of stepped or graduated stops arranged to control the operation of printing mechanism by which the registered weight is recorded on a printed slip or ticket.

The graduated stops and their associated mechanism are best shown in Figs. 11, 14 and 15. Mounted for rotation on the shaft A between the plates 40 and 59, as shown in Fig. 14, is a stop unit comprising stepped wheels 163 and 164, a toothed wheel 165, and a truing wheel 166. These parts are rigidly connected to one another and to a pinion 167 so that they rotate in unison with one another on the shaft A. The entire unit is driven by a pinion 168 which meshes with the gear wheel 138, as shown in Fig. 3. Means is provided for a limited amount of lost motion or flexibility between the pinion 168 and the stepped wheels constituting the stop mechanism. To secure this flexibility of drive a pair of discs 169 and 170 are journaled on the shaft A between the toothed wheel 165 and a flange 171 on a collar 172 formed integral with the gear 168. A pin 173 is secured to the flange 171 and extends into openings in the discs 169 and 170. The openings in the discs are somewhat larger circumferentially than the pin 173 so as to permit slight rotation of the discs 169 and 170 relative to the pin. Arms 174 and 175 are connected to the discs 169 and 170, respectively, and project outwardly from the shaft A in position to engage a pin 176 on the toothed wheel 165. A spring 177 draws the arms 174 and 175 toward one another so that their inner faces engage the pin 176 and so that the openings in the discs 169 and 170 will engage opposite sides of the pin 173. This arrangement will cause the wheel 165 to rotate in unison with the pinion 168, but if a force is exerted on the two elements tending to rotate them relative to one another, the spring 177 will yield to permit a limited amount of relative rotation.

The wheel 163 has its periphery shaped to form a series of ten steps of different radii, as shown in Fig. 11. This wheel controls the printing mechanism for the tens decimal order. The wheel 164 has its periphery shaped to form ten stepped members each comprising ten steps of different radii. These steps constitute stops for controlling the printing mechanism for the units decimal order. The wheel 165 has its periphery formed into a series of square-faced teeth 178 alternating with notches 179. These teeth and notches control the one-half pound printing device. The wheel 166 has its periphery provided with a plurality of notches 180 arranged to cooperate with a pointed truing dog 181. The gear for moving the stepped wheels is so proportioned that a weight of one-hundred pounds on the scale will produce one complete rotation of the stepped wheels. Two-hundred notches 180 are provided in the periphery of the wheel 166 so that when the dog 181 enters one of the notches it will true the wheel to the nearest one-half pound. It is for the purpose of permitting movement of the wheel 166 for this truing operation that the lost motion drive is provided between the stepped wheels and the gear 168. Pivotally mounted on a shaft 182 are lever arms 183, 184, 185 and 186 arranged to cooperate with the various stop members of the register mechanism.

The arm 184 which cooperates with the tens wheel is clearly shown in Fig. 11 of the drawings. Each of the levers is provided with a spring 187 normally pressing the lever toward its stop wheel and also with an integral arm 188 which carries a roller 189 in position to engage with one of a series of cams 190 on the cam shaft D. The cams 190 hold their lever arms out of contact with the respective stop wheels during the rotation of the wheels, but toward the close of the rotation of the drive shaft A the levers are released from their cams and move inwardly, or to the right, as viewed in Fig. 11, until each lever is arrested by its respective stop. The lever arm 184 is provided with a contact finger 191 for engaging the steps on the wheel 163 of the tens order. It will be noted that the zero step for this wheel is displaced about one-tenth of a revolution from the finger 191 when the parts are in their normal inactive position, as shown in Fig. 11. This permits an initial movement of the follower arm 96 before it is brought into a position corresponding with the zero position of the beam extension 45. If the arm 96 were held initially in zero position its stop 153 would be in contact with the lower end of the stop screw 92 which would prevent any oscillation of the scale beam below zero position. It is desirable, however, to permit the scale beam in coming to rest to vibrate past zero, and for this reason the follower arm 96 is pressed downwardly by the cam 150 to provide clearance between the stop 151 and the lower end of the screw 92. In like manner the actuator arm 95 is also normally held in position to permit clearance between its stop 98 and the screw 91. The preliminary movement of the stepped wheels to bring them to zero position is produced by tension in the spring 142. In order to place this spring under tension when the parts are at rest the ratchet wheel 129 is provided with a stop pin 192, Fig. 9, which engages a lug 193 on the frame plate 40 to fix the zero position of the ratchet wheel. This limit stop will hold the pinion 126 and consequently the sleeve 121 and the arm 141 in an initial zero position so that the latter part of the movement of the follower arm 96 under the influence of the cam 150 will rotate the gear wheel 138 and the arm 143 against the tension of the spring 142, thus placing sufficient tension in the spring 142 to return the arm 96 and the wheel 138 with the stepped wheels geared thereto to their initial position whenever the cam 150 is again rotated to release the arm 96. If the register mechanism is operated with no load on the scale platform the tension in the spring 142 will be sufficient to lift the follower arm 96 until the stop 153 engages the lower end of the screw 92 so that the register will be set at its zero position independent of any movement of the actuator arm 95.

A series of printing segments 194, 195, 196 and 197 are controlled by the lever arms 183, 184, 185, and 186, respectively, for the purpose of printing a number representing the weight of the scale platform. These segments, as shown in Fig. 20, are loosely mounted on a shaft 198 and each segment is provided with a pinion fixed thereto, the pinions being designated 199, 200, 201, 202 and 203, respectively. The lever arms are provided with gear segments 204 which mesh with their corresponding pinions. The segments 195 and 196 correspond to the tens and units decimal orders of the numbers printed and are controlled by the lever arms 184 and 185, respectively. The segment 197 is for printing half pounds and carries but a single printing type which is marked "½". This segment is controlled by the lever arm 186 which carries a finger 205, Fig. 11, in position to engage the teeth and notches on the wheel 165. Before the printing operation the stepped wheels are trued to the nearest one-half pound by the truing dog 181, and the teeth 178 and notches 179 are related to the steps on the wheel 164 so that in case the wheel has moved to the first half of any pound step the finger 205 will engage a tooth 178 on the wheel and thus prevent rotation of the segment 179 a sufficient amount to bring the type thereon into printing line. If, however, the stepped wheels are trued to a position to bring the second half of any pound step into alinement with the control finger for the lever arm 185, the finger 205 will then be disposed opposite a notch 179 so that the printing segment 197 will move to bring the "½" type into the printing line. In this way if the weight on the scale is one-half pound or more in excess of any particular whole number of pounds the stepped wheels will be trued to the second half of the pound position and the registered amount will show a one-half pound in addition to the integral number of pounds.

The segment 194 prints the digits in the hundreds decimal order and is controlled by carrying mechanism from the tens decimal order and also by the weight depositing mechanism. Since a weight deposited on the scale beam corresponds to two-hundred pounds on the platform it is desirable to rotate the segment 194 two points when the weight is deposited, and it is also desirable to rotate this segment one point for each revolution of the stepped wheels. This combined mechanism for carrying from the tens order and for inserting members corresponding to weights deposited is illustrated in Figs. 14 and 15.

The arm 183 for controlling the segment 197 is provided with a finger 206 which cooperates with a stepped block 207 secured to the periphery of an internal gear wheel 208. The gear wheel 208 is provided with spokes 209 secured to a hub member 210 which is rotatably mounted on the hub 211 of a spur gear 212, the gear 212 being loosely mounted on the shaft A, as shown in Fig. 14. Meshing with the gears 212 and 208 is a planetary pinion 213 mounted on a stud 214 which is carried on an arm 215 loosely journaled on the shaft A. The arm 215 is provided with a nose-piece 216 which bears against the periphery of a cam member 217 which is secured to a sleeve 218 journaled on a stud shaft 219. The sleeve 218 also has secured thereto a gear 220, see also Fig. 15, which meshes with an equal-sized gear 221 secured to the shaft A. The shaft 219 also carries a stepped wheel 222 which is adjustably secured to a gear 223 by pin and slot connections 224 so that the gear 223 and stepped wheel 222 rotate in unison with one another. The periphery of the wheel 222 is arranged in the path of the nose 216 on the arm 215.

As shown in Fig. 14, the gear 212 is connected by rivets 225 to a bar 226 which is journaled on the shaft A and which projects on diametrically opposite sides of the shaft. One end of the bar 226 has a spring 227 attached thereto tending to rotate the bar in a clockwise direction, as viewed in Fig. 15. The opposite end of the bar is adjustably connected by a slot and screw 228 with an arm 229, on the end of which arm a roller 230 is arranged in position to engage a cam 231 on the shaft C. The gear wheel 223 meshes with the pinion 167 which is secured to the stepped wheels, as previously explained. The pinion 167 and the gear 223 are so related to one another and to the stepped wheel 222 that a complete rotation of the pinion 167 after it has been brought to the initial zero position of the stepped wheels with which it is connected, will bring the first step of the wheel 222 past the nose-piece 216 and a second revolution of the pinion 167 will bring the second step on the wheel 222 past the nose-piece. When the nose-piece is released by the cam 217 through the rotation of the shaft A it will engage the surface of the stepped wheel 222, and if this wheel has been moved an amount corresponding to one-hundred pounds by the pinion 167, the nose-piece 216 will engage the second step on the wheel, reguarding the outer or zero position on the first step. This will impart sufficient movement to the arm 215 to shift the axis of the planetary pinion 213 and rotate the gear wheel 208 an amount corresponding to one step on the block 207. This will permit the arm 183 to rotate the segment 197 to show the digit "1" in the hundreds order. A movement of the stepped wheels on the shaft A corresponding to two-hundred pounds will bring the nose-piece 216 opposite the third step on the wheel 222 and consequently register "2" in the hundreds place. This it will be seen constitutes a carrying mechanism for the stepped wheels from the tens to the hundreds order.

If the shaft C is rotated to deposit a weight on the scale beam prior to the operation of the register mechanism, the arm 229 will be moved upwardly, as shown in Fig. 15, and this in turn will rotate the gear 212 in a counter-clockwise direction, as viewed in Fig. 15. Since the pinion 213 is held stationary by the cam 217 and the spring 232 the rotation of the gear 212 will be transmitted to the internal gear 208, the amount of rotation being sufficient to shift the stepped block 207 two steps. This will insert two-hundred pounds in the hundreds order of the printing mechanism corresponding to the amount which the dropped weight affects the scale reading. The amount carried to the hundreds order during the subsequent operation of the register mechanism may be added to the two-hundred pounds already inserted by further rotation of the gear 208 by the shifting of the position of the pinion 213. It will thus be seen that two-hundred pounds is inserted in the register mechanism for each weight dropped, and one-hundred pounds is inserted for each rotation of the stepped wheel in the tens order. The carrying operation from the tens to the hundreds order must, of course, take place after the setting of the tens wheel, and this is controlled by the cam 217 which is arranged to release the arm 215 after the tens wheel has been set, but prior to the release of the lever arms controlled by the cams 190. The screw and slot adjustments 224 and 228 are for the purpose of setting the parts accurately to compensate for any variations in individual machines.

*Printing*

The segments 194, 195, 196 and 197 may be arranged to visibly indicate the weight of the scale platform or to record the weight by suitable printing mechanism, as shown in the drawings. The printing mechanism will be readily understood from Figs. 11, 20 and 21. Attached to the frame plates 40 and 59 are brackets 233 which support ribbon shafts 234 having spools 235 thereon and beveled pinions 236 arranged to mesh alternately with pinions 237 on a shaft 238. Springs 239 surround the shafts 234 and bear at their lower ends against washers 240 and at their upper ends against collars 241 secured to the shafts. These springs constitute friction devices for preventing accidental rotation or over-run of the ribbon spools. The shaft 238 may be shifted to bring either of the pinions 237 into mesh with its corresponding pinion so as to reverse the movement of the ribbon 242 on the spools 235. A detent 243 is provided to hold the shaft in its different positions and a finger-piece 244 is secured to the end of the shaft by which it is shifted longitudinally.

A platen frame 245 is pivoted at 246 between the frame plates 59 and 40 and carries a shaft 247 to which a platen 248 is secured. A finger-wheel 249 is connected to the shaft 247 by gears 250, by means of which the platen is rotated to feed a strip of paper 251 carried on a spool 252. Rollers 253 press the strip 251 against the platen 248 and are drawn toward the platen by springs 254. As shown in Fig. 3, the frame 245 is provided with an arm 255 which carries a half cylindrical pin 256 arranged to bear against the periphery of a cam 257 on the shaft A. The cam 257 releases the frame 245 after the weight has been set up in the printing segments and permits the frame to move inwardly under the influence of springs 258, Figs. 3 and 11, thus causing the numbers set up in the printing segments to be impressed upon the paper strip 251 by the type on the segments acting through the ribbon 242. After the printing operation the finger-wheel 249 is rotated to move the printed ticket from the frame 245 and the paper bearing the impression may be torn off against a stop plate 259 and disposed of according to the system employed.

A spring-pressed frame 260 is provided with a roller 261 arranged to bear against the paper roll 252 to prevent overrun of the paper.

It sometimes happens that the balancing mechanism of a scale is slightly out of adjustment so that the beam may not return to zero, but may remain slightly below the zero position when there is no load on the platform. It will readily be seen that such a condition would cause the arrest of the follower arm 96 before it brought the stepped wheels to their zero position if the register mechanism were operated with no load on the scale platform. Such a condition would bring the stepped wheel of the tens decimal order to rest with the nine step opposite the finger 191 instead of the zero step and cause a "9" to be printed in the tens column instead of a zero if no provision were made to overcome this defect. To prevent such a misprint a pair of stops 262 are provided to arrest the printing frame in case the register wheels are not rotated a sufficient distance to bring them to their zero position.

The stops 262 are carried on a shaft 263 and are normally disposed in the path of movement of blocks 264 on the frame 245. A trip finger 265 is secured to the shaft 263 in the path of a tappet 266 pivotally mounted at 267 on the stepped wheel 163. A spring 268 draws one end of the tappet 266 against a stop pin 269 which prevents rotation of the tappet in one direction. When the stepped wheel 163 has rotated a sufficient amount to bring the steps thereon into their zero position, the tappet 266 will engage the trip finger 265 and rotate the stop arms 262 out of the path of the blocks 264 on the frame 245. A catch 270 actuated by a spring 271 engages a notch 272 on a detent 273 secured to the shaft 263. A spring 274 is secured to the detent 273 and tends to return the arms 262 to their initial position. The engagement between the catch 270 and the notch 272 prevents such return, however, until the catch is released by a pin 275 secured to the cam 190 on the shaft D.

The ribbon spool shaft 238 is driven from the main shaft A by a train of gearing shown in Figs. 6, 7 and 8. A pinion 276 is secured to the shaft A adjacent the frame plate 61 and meshes with a gear 277 which has a "2 to 1" ratio to the gear 276 and which is journaled on a stud 278 carried by the plate 61. Secured to the gear 277 to rotate in unison therewith is a pair of discs 279 and 280, each of the discs being cut away for a portion of its periphery, as shown at 281 and 282, Fig. 8. The rim portions of the discs which are not cut away overlap, as shown at 283, for a space equal to the width of a gear tooth. Meshing with the discs 278 and 279 is a pair of mutilated pinions 284 and 285 journaled on a stud 286 and connected to one another and to a pinion 287 by pins 288. The pins 284 and 285 each have every other tooth omitted and the two are arranged with the remaining teeth staggered. It will be seen that the pinions and disc constitute a form of "Geneva" lock by which the mutilated pinions will be rotated an amount corresponding to one tooth for each half rotation of the discs 278 and 279. This rotation will be transmitted through reduction gearing 289 to a pinion 290 on the end of the shaft 238, the pinion 290 having elongated teeth to permit the longitudinal movement of the shaft 238.

By the chain of mechanism described the ribbon spools are given a slight rotation for each rotation of the drive shaft A and the gearing is timed to bring the rotation at a period in the cycle of operation when the ribbon is free from the printing mechanism. It will be noted that the various cams for controlling the different mechanism, as described, are all provided with portions for returning the parts to initial positions after the printing operation is completed and at the close of the rotation of the drive shaft A.

Multiple drop weight mechanism

In some cases it may be desirable to employ more than a single drop weight for the scale beam 30. Where more than a single weight is used provision must be made for inserting the corresponding value each time a weight is deposited. Mechanism for this purpose is shown in Figs. 22 to 26, inclusive. As there shown, the scale beam 30 is provided with a weight-receiving bar 300 which projects on opposite sides of the beam 30. One weight 301, similar to the weight 33 previously described, is supported on pins 302 carried by arms 303 which are secured to a sleeve 304 journaled on a drop shaft 305 and which are secured to pinions 306 by which the arms 303 are rotated to deposit the weight 301 upon the bar 300, as previously explained, in connection with Fig. 4. A pair of weights 307 and 308 are carried on arms 309 and 310, respectively. The arms 309 and 310 are connected with sleeves journaled on the shaft 305 and attached to pinions 311 and 312. The pinions 306, 311 and 312 each comprises a pair of wheels 313 and 314, as shown in Figs. 25 and 26, each wheel having its alternate teeth removed, and the teeth of the two wheels being staggered relative to one another.

The wheels 313 and 314 are arranged to mesh with discs 315 and 316, respectively, which have teeth 317 formed thereon along a portion of their periphery, while one of the wheels is cut away, as shown at 318, to form a lock for the wheels 313 and 314 for the major portion of the periphery of the discs. In this way a form of "Geneva" lock gear is provided which will drive the combined pinions 306, 311 or 312 for a portion of a revolution of the shaft 319 on which the discs are mounted, but will hold the pinions against rotation during further movement of the shaft. Pairs of discs 320, 321 and 322 are provided for the pinions 306, 311 and 312, respectively. The shaft 319 is driven by gears 323 and 324, the latter of which is fixed on the shaft 305. The shaft 305 is rotated by a hand wheel 325 secured to the end of the shaft and a detent 326 is arranged to engage a notched disc 327 secured to the shaft 305 to divide the rotation of the shaft 305 into separate parts.

During the first partial movement of the hand wheel 325 the lock gearing comprising the parts 306 and 320 will move the arms 303 to deposit the weight 301 on the scale beam. Subsequent rotation of the shaft 319 will not affect the pinion 306 since during such subsequent rotation the pinion 306 will be in contact with the locking portions of the discs 320. The first movement of the hand wheel 325 will bring the detent 326 into engagement with the second notch on the disc 327. The driving teeth on the discs 321 and 322 are set backwardly relative to the teeth on the discs 320 so that during the second portion of the rotation of the hand wheel 325 the pinions 311 and 312 will be operated to deposit the weights 307 and 308 upon the receiving bar 300. These two weights are together equivalent to the single weight 301 and correspond to a weight of two-hundred pounds upon the scale platform in the particular embodiment described. It will readily be understood that the device may be arranged to deposit any number of weights desired and that the deposited weights may represent various amounts upon the scale platform, depending upon the particular weighing scale construction.

Where a plurality of weights are used the stop block for the hundreds order of the registering mechanism must be correspondingly modified. In Fig. 23 the hundreds stop block is shown at 328. In this case six steps in addition to the zero stop are provided, two steps for each set of drop weights, and two sets for the register wheel carrying mechanism. In place of the cam 231 for moving the arm 229 a gear segment 329 is provided which meshes with a pinion 330 on the shaft 305. Movement of the hand wheel 325 during the first part of a revolution will raise the arm 229 a sufficient amount to shift the stop block 328 a distance corresponding to two steps on the block, and the second movement of the hand wheel 325 will shift the stop block two more steps. Upon return movement of the hand wheel 325 the arms 303, 309 and 310 will pick up their respective weights and restore them to normal inoperative position.

It will be noted that the jaws 64 and 65 for clamping the bar 63 are provided with a plurality of springs 68 symmetrically disposed relative to the jaws so that uniform pressure is brought to bear throughout the face of the jaws and twisting and cramping is avoided. The bracket 79 which supports the operating gears 74 and 75 is adjustably mounted on the plate 80 by screws 79' operating in slots 81' so that the jaws may be accurately positioned relative to the bar 63.

I claim:—

1. The combination with a weight controlled scale beam, of a device connected with said scale beam and movable relative thereto, and means for yieldingly holding said device in a definite position relative to said scale beam against the action of limited force but arranged to move under force in excess of the limited amount.

2. The combination with the beam of a weighing scale, of registering mechanism for said weighing scale, means connected with said beam for controlling said registering mechanism, means for retaining said controlling means in a definite relation to said beam and yielding means for holding said retaining means in operative position.

3. The combination with a weight controlled scale beam, of an extension arm thereon, a spring for moving said extension arm to a predetermined position relative to said beam when said arm is displaced from said position and means for offering initial resistance to displacement of said extension from said position.

4. The combination with a weight controlled scale beam, of an extension arm thereon, a spring for moving said extension arm to a predetermined position relative to said beam when said arm is displaced from said position, and means for yieldingly retaining said arm in said position.

5. The combination with the beam of a weighing scale, of registering mechanism, for said scale, an arm carried by said beam for controlling said registering mechanism, a spring for returning said arm to a predetermined position relative to said scale beam, and a yielding latch for retaining said arm in said position.

6. In combination, a scale beam movable amounts proportional to the weights on the scale, registering mechanism for said scale, means carried by said beam and movable therewith for controlling said registering mechanism, and means for yieldingly retaining said controlling means in definite relation to said scale beam.

7. The combination with a pivoted scale beam, of registering mechanism, and a control device for said registering mechanism yieldingly connected with said scale beam, said control device being balanced relative to the pivot of said scale beam to prevent said device from affecting the balance of said scale beam.

8. The combination with a scale beam, of registering mechanism, and a control device for said registering mechanism yieldingly connected with said scale beam and movable in unison therewith, said control device being counterbalanced to move about the same pivotal center as said scale beam.

9. The combination with a scale beam, of registering mechanism, an arm for controlling said registering mechanism yieldingly supported to move in unison with said scale beam, and an adjustable counterbalance for said arm to prevent said arm from affecting the balance of said beam.

10. The combination with a scale beam, of an arm pivoted upon the axis of said beam, and means for automatically returning said arm to a definite position relative to said beam when said beam and arm are angularly displaced relative to one another upon said axis.

11. The combination with a scale beam, of an arm connected with said beam and movable relative thereto about the pivotal axis of said beam, a spring catch for yieldingly retaining said arm in a definite position relative to said beam, and a spring for returning said arm to said position when angularly displaced therefrom.

12. The combination with a scale beam, of a support fixedly secured thereto, an arm pivoted on said support, and means for yieldingly retaining said arm in a definite position relative to said support and said beam.

13. The combination with a scale beam, of a bar fixedly secured thereto, an arm pivotally mounted on said bar, a catch for yieldingly retaining said arm in a definite position relative to said bar, a spring for returning said arm to said position, and an adjustable counterbalance for said arm and bar.

14. The combination with a scale beam, of registering mechanism, a control device yieldingly connected with said scale beam and actuated thereby, and means for holding said control device in fixed position while permitting movement of said scale beam.

15. The combination with a movable weight controlled member, of registering mechanism, means yieldingly connected directly to and movable with said member and actuated thereby for controlling said registering mechanism, and mechanism for holding said controlling means in fixed position while permitting movement of said weight controlled member relative thereto.

16. The combination with a scale beam, of a stop device movable therewith, means for yieldingly retaining said stop device in definite position relative to said scale beam, and means for locking said stop device in fixed position while permitting movement of said scale beam relative thereto.

17. The combination with a scale beam, of a stop arm movable therewith about the pivotal axis of said scale beam, means for yieldingly retaining said stop arm in definite relation to said scale beam, and means for holding said stop arm in fixed position while permitting movement of said scale beam upon its pivotal axis.

18. In combination with the beam of a weighing scale, of registering mechanism for said scale, a stop arm for controlling said registering mechanism, means for yieldingly connecting said stop arm with said scale beam to cause said arm to be moved amounts depending upon the weight upon said scale, and means for holding said stop arm in fixed position while permitting movement of said scale beam.

19. The combination with the beam of a weighing scale, of registering mechanism for said scale, an arm yieldingly connected with said beam and movable relative thereto about the pivotal axis of said beam, means for yieldingly retaining said arm in fixed position relative to said beam to cause said arm to move in unison with said beam during a weighing operation, means for holding said arm in fixed position while permitting movement of said beam relative thereto, and means for restoring said arm and beam to normal position relative to one another when said arm is released from said holding means.

20. The combination with the movable beam of a weighing scale, of registering mechanism for said scale, means yieldingly connected to said beam for controlling said registering mechanism, and means for holding said controlling means in the position it assumes under the control of said beam while permitting movement of said beam in case the load is removed from said scale.

21. The combination with the movable beam of a weighing scale, of registering mechanism for said scale, a device connected with said beam to move therewith, means for holding said device in fixed position to permit said device to control the operation of said registering mechanism, and means for yieldingly holding said device and beam in definite relation to one another but arranged to permit movement of said beam relative to said device when said device is held in fixed position.

22. The combination with the movable beam of a weighing scale, of registering mechanism for said scale, a stop arm for controlling said registering mechanism, means for holding said stop arm in fixed position during the control of said registering mechanism thereby, and yielding means for connecting said arm and scale beam in definite relation to one another to cause said beam to set said arm in a position corresponding to the weight on the scale but permitting movement of said arm relative to said beam in case the weight is changed on said scale after said arm is fixed by said holding means.

23. The combination with a movable weight controlled member, of means for holding said member in fixed position, and a device movably connected with said weight controlled member for engagement with said holding means.

24. The combination with a weight controlled member, of registering mechanism controlled by said member, a device connected with said member and movable relative thereto, and means for engaging said device and acting thereon rigidly to hold said weight controlled member in fixed position at any point in the range of movement of said weight controlled member.

25. The combination with registering mechanism for weighing scales, of weight actuated means for controlling said registering mechanism, a contact device connected with said weight actuated means, and means for engaging said contact device and acting thereon rigidly to hold said weight actuated means in fixed position at any position in the range of movement of said weight controlled means, said contact device being movable relative to said weight actuated means to permit said device to accommodate itself to said holding means.

26. The combination with registering mechanism for weighing scales, of means for controlling said registering mechanism, said controlling means being movable amounts proportional to articles being weighed, a clamp for holding said controlling means in fixed position relative to said registering mechanism, and a contact device on said controlling means arranged to yield to said clamp while retaining said controlling means in fixed position relative to said registering mechanism.

27. The combination with registering mechanism for a weighing scale, of controlling means for said registering mechanism, a clamp for said controlling means, and a contact device engaged by said clamp and fixed to said controlling means against movement relative thereto in the direction of movement of said controlling means but otherwise movable relative thereto to permit adjustment thereof relative to said clamp, said contact device being engageable by said clamps to hold said controlling means at any position in the range of movement thereof.

28. The combination with registering mechanism for a weighing scale, of a weight controlled member for determining the operation of said registering mechanism, a clamp for holding said weight controlled member in fixed position relative to said registering mechanism, and a contact device carried by said weight controlled member for engagement with said clamp, said contact device being fixed to said weight controlled member against movement relative thereto in the direction of movement of said weight controlled member but rotatable about a longitudinal axis to enable it to accommodate itself to said clamp.

29. The combination with registering mechanism for a weighing scale, of a weight controlled member for determining the operation of said registering mechanism, a clamp for holding said weight controlled member in fixed position relative to said registering mechanism, and a contact device carried by said weight controlled member for engagement with said clamp, said contact device being fixed to said weight controlled member against movement relative thereto in the direction of movement of said weight controlled member but movable transversely to the direction of movement of said weight controlled member to permit it to accommodate itself to said clamp.

30. The combination with registering mechanism for a weighing scale, of a weight controlled member for determining the operation of said registering mechanism, a clamp for holding said weight controlled member in fixed position relative to said registering mechanism, and a contact device carried by said weight controlled member for engagement with said clamp, said contact device being fixed to said weight controlled member against movement relative thereto in the direction of movement of said weight controlled member but movable in a plurality of directions relative to said weight controlled member to permit it to accommodate itself to said clamp.

31. The combination with registering mechanism for a weighing scale, of a weight controlled member for determining the operation of said registering mechanism, a clamp for holding said weight controlled member in fixed position relative to said registering mechanism, and a contact device carried by said weight controlled member for engagement with said clamp, said contact device being fixed to said weight controlled member against movement relative thereto in the direction of movement of said weight controlled member but having limited pivotal movement relative to said weight controlled member to permit it to accommodate itself to said clamp.

32. The combination with registering mechanism for a weighing scale, of a weight controlled member for determining the operation of said registering mechanism, a clamp for holding said weight controlled member in fixed position relative to said registering mechanism, and a contact device carried by said weight controlled member for engagement with said clamp, said contact device being fixed to said weight controlled member against movement relative thereto in the direction of movement of said weight controlled member but movable about a plurality of pivotal axes relative to said weight controlled member to permit it to accommodate itself to said clamp.

33. The combination with a movable weight controlled member, of a pair of jaws for holding said member in fixed position, and a plurality of springs for closing said jaws, said springs being arranged in spaced position along said jaws to distribute the pressure of said jaws upon said weight controlled member.

34. The combination with a movable weight controlled member, of a pair of jaws for holding said member in fixed position, and a plurality of springs for closing said jaws, said springs being arranged substantially in symmetrical relation to one another on said jaws to provide an even distribution of the pressure upon said weight controlled member.

35. The combination with a movable weight controlled member, of a clamp for holding said member against movement, and a friction device arranged on the surface of said clamp and supplemental to the main body thereof for engaging said device and for preventing relative movement of said device and clamp.

36. The combination with a movable weight controlled member, of a pair of clamping jaws for holding said member in fixed position, said jaws having spring-pressed friction devices arranged on the surfaces thereof for engaging said clamp.

37. The combination with a movable weight controlled member, of a pair of gripping jaws disposed on opposite sides of said member and spaced substantially equal distances therefrom, springs for closing said jaws upon said member, and gearing for controlling the movement of said jaws to bring them into gripping relation with said member while said member remains in substantially its initial position.

38. The combination with a weight controlled member, of a pair of gripping jaws for holding said member in fixed position, and means for adjusting said jaws relative to said member so that said jaws will grip said member without materially moving the same.

39. The combination with a weight controlled member, of a pair of gripping jaws for holding said member in fixed position, springs for closing said jaws, gearing for controlling the closing movement of said jaws, and means for adjusting said jaws in unison with one another relative to said movable member.

40. The combination with registering mechanism, of a weight actuated member for controlling said registering mechanism, a grip device carried by said weight actuated member and having limited movement relative thereto, a pair of sliding jaws disposed on opposite sides of said grip device, spring-pressed friction means carried by said jaws, a plurality of springs for closing said jaws on said grip device, racks on said jaws, a pair of gears meshing with one another, each gear arranged to mesh with a rack on one of said jaws, means for shifting said gears and jaws in unison with one another to adjust said jaws relative to said grip device, and means for holding and releasing said gears to control the movement of said jaws under the tension of said springs.

41. The combination with a movable weight controlled member, of a pair of gripping jaws for holding said member, friction means carried by said jaws, springs for closing said jaws, and separate springs for pressing said friction means against said weight controlled member.

42. The combination with registering mechanism for weighing scales, of an actuator for said mechanism, a movable member, said registering mechanism being connected with said movable member to move amounts proportional to movements of said movable member, resilient means for transmitting motion from said actuator to said movable member, and a stop for limiting the movement of said movable member, said actuator being arranged to exert tension through said resilient means on said movable member after said movable member has been arrested by said stop.

43. The combination with registering mechanism having a member movable proportional to amounts registered, of means for moving said member, a resilient connection between said member and its moving means, and a weight controlled stop for arresting said member, said moving means being arranged to exert force on said movable member through said resilient means to bring said member into engagement with said weight controlled stop and to resiliently draw said member against said stop when it has come in contact therewith.

44. Registering mechanism for weighing scales comprising a member, movable amounts proportional to amounts registered, an actuator for said movable member, means for positively driving said actuator, resilient means for transmitting movement from said actuator to said movable member, and a weight controlled stop for arresting the movement of said member to limit the operation of said registering mechanism to an amount proportional to the weight of an article, said movable member being resiliently held in contact with said stop after the arrest thereof.

45. Registering mechanism comprising an actuator, a follower, movable amounts proportional to amounts registered, a spring drive for said follower, means for moving said actuator into position to operate said spring drive, and positive means for moving said actuator to operate said spring drive and move said follower.

46. Registering mechanism for weighing scales comprising a follower, an actuator, yielding means for transmitting motion from said actuator to said follower, a spring for moving said actuator in one direction to bring said actuator into position to drive said follower, means for positively moving said actuator in a reverse direction to drive said follower, and weight controlled means for limiting the movement of said follower.

47. In combination, registering mechanism, an actuator therefor, a spring for moving said actuator in one direction, a non-resilient drive for returning said actuator, weight controlled means for limiting the movement of said actuator, yielding means operated by said actuator during its return stroke for driving said registering mechanism, and a weight controlled stop for limiting the movement of said registering mechanism.

48. The combination with registering mechanism, of a weight controlled stop for limiting the movement thereof, a device movable into contact with said stop for controlling the operation of said registering mechanism, a positively driven actuator for said device, and a yielding connection between said actuator and said device arranged to exert tension on said device after it has engaged said stop to prevent re-bound of said device.

49. Registering mechanism comprising an actuator, a follower, weight controlled means for limiting the movement of said follower, and yielding means for transmitting motion from said actuator to said follower, said yielding means comprising a pair of rotatable members one of which is driven by said actuator and the other of which drives said follower, and a spring for transmitting motion from one of said members to the other.

50. Registering mechanism for weighing scales comprising an actuator, means for imparting reciprocatory movement to said actuator, resilient means operated by said actuator on its return movement for driving said registering mechanism, and weight controlled means for limiting the amplitude of movement of said actuator.

51. Registering mechanism comprising an actuator, means for imparting reciprocatory movement to said actuator, weight controlled means for limiting the amplitude of said reciprocatory movement, a follower, weight controlled means for limiting the movement of said follower, and yielding means for transmitting movement from said actuator to said follower during the return movement of said actuator.

52. Registering mechanism for weighing scales comprising an actuator, means for imparting reciprocatory movement to said actuator comprising a spring for moving said actuator on its forward stroke, and a positive drive for returning said actuator against the tension of said spring, weight controlled means for limiting the forward movement of said actuator, resilient means for transmitting movement from said actuator to said register during the return stroke of said actuator, and weight controlled means for arresting the movement of said register prior to the completion of the return stroke of said actuator.

53. Registering mechanism comprising an actuator, a follower, means for imparting reciprocatory movement to said actuator, weight controlled means for limiting the amplitude of said reciprocatory movement, resilient means for transmitting movement from said actuator to said follower during the return stroke of said actuator, and weight controlled means for arresting the movement of said follower prior to the completion of the return stroke of said actuator.

54. Registering mechanism for weighing scales comprising an actuator and a follower, yielding means for transmitting movement from said actuator to said follower, and weight controlled means for arresting the movement of said follower prior to the completion of the movement of said actuator.

55. Registering mechanism comprising an actuator and a follower, means for imparting reciprocatory movement to said actuator, a spring drive for transmitting movement to said follower, and ratchet mechanism operated by said actuator during its return stroke for imparting movement to said spring drive.

56. Registering mechanism comprising an actuator, a follower, means for imparting reciprocatory movement to said actuator, weight controlled means for limiting the amplitude of said reciprocatory movement, ratchet mechanism operated by said actuator during the return stroke thereof, yielding means for transmitting movement from said ratchet mechanism to said follower, and weight controlled means for limiting the movement of said follower to arrest said follower prior to the completion of the return stroke of said actuator.

57. Registering mechanism comprising an actuator, a follower, ratchet mechanism operated by said actuator, resilient means for transmitting motion from said ratchet mechanism to said follower, means for disconnecting said actuator from said ratchet mechanism at the completion of a movement of said actuator, and means for retaining tension in said motion transmitting means after the disconnection of said ratchet mechanism.

58. Registering mechanism for weighing scales comprising an actuator, means for imparting reciprocatory movement to said actuator, ratchet mechanism operated by said actuator during the return stroke thereof, a follower for controlling the operation of said registering mechanism, weight controlled means for limiting the movement of said follower, resilient means for transmitting motion from said ratchet mechanism to said follower, means for disconnecting said actuator from said ratchet mechanism at the end of the return stroke of said actuator, and a ratchet device for holding said ratchet mechanism against return movement to maintain tension in said resilient motion transmitting means.

59. Registering mechanism for weighing scales comprising a movable member, a register movable in unison with said member, a spring for transmitting motion to said member, and means for tensioning said spring to impart preliminary movement to said member at the beginning of a registering operation.

60. Registering mechanism comprising a movable member, weight actuated means for arresting the movement of said member, a spring for transmitting motion to said member, and means for holding said member away from said weight actuated means when said weight actuated means is in zero position.

61. Registering mechanism comprising a movable member, a spring for transmitting motion to said member, weight controlled means for arresting the movement of said member, and means for holding said member out of contact with said weight controlled means when said weight controlled means is in zero position, said holding means being arranged to exert tension on said motion transmitting spring to cause said spring to impart preliminary movement to said member when released from said holding means.

62. Registering mechanism comprising an actuator, a follower, resilient means for transmitting motion from said actuator to said follower, weight controlled means for limiting the movement of said follower, and means for holding said follower out of contact with said weight controlled means when said weight controlled means is in zero position to permit oscillation of said weight controlled means, said resilient motion transmitting means being arranged to return said follower to zero position when released by said holding means independently of any operation of said actuator.

63. Registering mechanism for weighing scales comprising a movable member, a weight controlled device for limiting the movement of said member, and adjustable means for varying the amount of movement of said member different amounts proportional to the load on said scale for given positions of said weight controlled device.

64. Registering mechanism for weighing scales comprising a movable weight controlled stop, a follower for engaging said stop, and adjustable means for varying the amount of movement of said follower different amounts proportional to the load on said scale for a given movement of said stop.

65. Registering mechanism comprising a movable weight controlled stop, a follower for engaging said stop to limit the movement thereof to amounts proportional to the movement of said stop, and adjustable means for varying the actual movement of said follower for given movements of said stop while retaining the proportionality between the movements of said follower and stop.

66. Registering mechanism comprising a movable member, a follower arranged to move distances proportional to the movement of said member, and adjustable means for causing variations in the actual amount of movement of said follower while maintaining the proportionality of the movements of said follower and stop.

67. Registering mechanism comprising a movable weight controlled stop, a follower having means thereon for engaging said stop to arrest said follower, and adjustable means to progressively move said engaging means relative to said follower during movement of said follower toward said stop.

68. Registering mechanism comprising a movable weight controlled stop, a follower having means thereon for engaging said stop to arrest said follower, and means for controlling the position of said engaging means relative to said follower during the movement of said follower, said controlling means being adjustable to hold said engaging means in fixed position relative to said follower or to cause said engaging means to progressively move relative to said follower toward or away from said stop during the movement of said follower toward said stop.

69. Registering mechanism for weighing scales having movable weight controlled members, said mechanism comprising a follower arranged to move amounts proportional to the movement of said weight controlled members, and adjustable means for controlling the actual movement of said follower for different movements of said weight controlled members while maintaining the proportionality of the movements of said follower and weight controlled members to adapt said registering mechanism to different scales in which the movements of the weight controlled members differ.

70. Registering mechanism for weighing scales comprising a stop arranged to be connected with the weight controlled members of a scale, a follower arranged to cooperate with said stop, means on said follower for engaging said stop to limit the movement thereof, and adjustable means for controlling said engaging means to adapt said registering mechanism to different scales having weight controlled members the movements of which differ from one another for a given weight.

71. The combination with a scale beam, of a stop carried by said scale beam, a follower having means thereon for engaging said stop, and an adjustable device arranged to be set in a position to shift said engaging means relative to said follower during the movement of said follower toward said stop.

72. The combination with a scale beam, of a stop controlled thereby, registering mechanism comprising a follower having a device pivoted thereon for engaging said stop, and an adjustable guide for shifting the position of said device relative to said follower during the movement of said follower toward said stop.

73. The combination with registering mechanism, of actuating means therefor, and a yielding connection between said registering mechanism and its actuating means, said yielding connection comprising a driver and a follower, the driver having a pair of contact members for engaging, means on said follower, said contact members being yieldably held against said means on said follower by a yielding means separate from the driving means to permit the movement of said follower a slight distance in either direction relative to the driver.

74. Registering mechanism for weighing scales comprising a rotary member, weight controlled means for actuating said member, means for truing said rotary member, and a yielding connection between said rotary member and its actuating means, said connection comprising a pair of arms mounted to move concentrically with said rotary member, a stop connected with said rotary member, and a spring for holding said arms in contact with said stop to impart movement to said rotary member when said arms are moved in either direction by said actuating means, said arms being arranged to yield relative to said actuating means to permit slight movement of said rotary member in either direction while said actuating means remains stationary.

75. Registering mechanism comprising a graduated member, a control device arranged to cooperate with the graduations of said member, means for imparting relative movement to said graduated member and control device so that said control device will cooperate with different graduations, means for dividing said relative movement into steps of less magnitude than said graduations so that said control device will cooperate with a single graduation for a plurality of positions of said graduated member relative to said control device, and fraction registering mechanism depending for its operation upon the relative position of said control device to the graduation with which it cooperates.

76. Registering mechanism comprising a graduated member and a control member movable relative to one another, means for truing said members relative to one another to spaced distances representing fractional parts of a graduation on said graduated member, and fraction registering mechanism for registering a fraction representing the fractional part of a graduation to which said graduated member and control member are relatively trued.

77. Registering mechanism comprising a graduated member and a control member arranged to cooperate therewith, means for truing said members relative to one another to cause said control member to cooperate with either of the forward or rear half of a given graduation for registering an integral quantity represented by said graduation, and means for registering a one-half part of said quantity when said control member cooperates with the rear portion of said graduation.

78. Registering mechanism comprising a graduated member and a control member movable relative to one another, means for truing said members relative to one another to the nearest position corresponding to one-half the amplitude of a graduation to cause said control member to cooperate with either the first or the second portion of a graduation for registering the integral quantity corresponding to said graduation, and fraction registering mechanism for indicating which half of a graduation the control member is in cooperation with when an integral quantity is registered.

79. Registering mechanism comprising a stepped wheel having graduations thereon corresponding to unit integral quantities, means for truing said wheel to the nearest position corresponding to one-half the amplitude of a unit graduation, and means for registering one-half when said wheel is trued to the second part of any graduation.

80. Registering mechanism comprising a movable member having graduations thereon corresponding to integral unit quantities, means cooperating with said graduations for registering the quantities represented by said graduations, said cooperating means being operable for different relative positions thereof to a given graduation to register the quantity represented by said graduation, and means for registering a fractional portion of the quantity represented by a graduation corresponding to the relative position of cooperation between said cooperating means and said graduation.

81. Registering mechanism comprising a graduated member movable to two different positions for each integral quantity registered, fraction registering mechanism, and means controlled by said graduated member for preventing operation of said fraction registering mechanism for one position of said graduated member corresponding to each integral quantity registered but permitting operation of said fraction registering mechanism for a different position of said graduated member corresponding to said integral quantity.

82. Registering mechanism comprising a wheel having graduations thereon corresponding to successive integral quantities, means arranged to cooperate with each of said graduations for a plurality of positions of said wheel, fraction registering mechanism, and a stop wheel connected with said graduated wheel to move in unison therewith, said stop wheel having means thereon for controlling said fraction registering mechanism to cause said mechanism to register a fraction corresponding to the relative position of said graduations and said cooperating means.

83. Registering mechanism comprising a stepped wheel having stops thereon representing successive integral numbers, a toothed wheel connected with said stepped wheel the teeth of which correspond to fractional portions of the stops on said stepped wheel, integer registering mechanism cooperating with said stepped wheel, and fraction registering mechanism cooperating with said toothed wheel.

84. Registering mechanism comprising a rotary member having means thereon for controlling the registration of numbers of a given decimal order, a second rotary member having means thereon for controlling registration of numbers of the next higher decimal order, and means for carrying from the first of said rotary members to the second, said carrying means comprising a stepped wheel controlled by said first member, planetary gearing for operating said second member, and means controlled by said stepped wheel for operating said planetary gearing.

85. The combination with a weighing scale having a weight controlled member, of registering mechanism controlled by said member, said registering mechanism having portions thereof corresponding to different decimal orders, means for carrying from a lower to a higher decimal order, and means for inserting quantities in the higher decimal order other than the quantities inserted therein by the carrying means.

86. The combination with a weighing scale having a movable member for indicating weights up to and including a multiple of one-hundred pounds and drop weights for increasing the capacity of said scale in successive steps corresponding to the amount of said limiting quantity, of registering mechanism controlled by said movable member and having parts representing different decimal orders, means for carrying from the tens to the hundreds decimal order of said registering mechanism, and means for inserting in the hundreds decimal order of said registering mechanism an amount representing the increase in the capacity of said weighing mechanism due to the deposit of drop weights.

87. Registering mechanism for a weighing scale comprising a counter unit, mechanism for carrying from one decimal order to another of said unit, weight indicating means on said scale for controlling said counter unit, means for inserting an additional quantity in one of the decimal orders of said counter unit, and means connected with said scale for controlling the amount so inserted.

88. Registering mechanism for a weighing scale comprising a counter unit, means for carrying from one decimal order to another of said counter unit, and mechanism for inserting additional quantities into the higher order of said counter unit, said carrying and inserting mechanism comprising planetary gearing, one element of which is controlled by said carrying mechanism and another element of which is controlled by said inserting mechanism.

89. Registering mechanism for weighing scales comprising a counter unit having means for carrying from a lower to a higher decimal order, means for inserting additional quantities into said higher order, weight indicating means on said scale for controlling said counter unit, and separate weight indicating means on said scale for controlling said inserting means, said carrying and inserting means comprising planetary gearing, one element of which is controlled by said carrying means and another of which is controlled by said inserting means.

90. The combination with a weighing scale, of registering mechanism therefor, said registering mechanism comprising a counter unit having different decimal orders, means for carrying from the tens to the hundreds order of said unit, said carrying means comprising one element of a planetary gear system, means for actuating another element of said gear system to insert additional quantities in the hundreds order of said counter, separate weight indicating means on said scale, mechanism controlled by one of said weight indicating means for actuating said counter, and mechanism controlled by the other of said weight indicating means for actuating the means for inserting quantites in said hundreds order so that the total quantity indicated by said counter will show the total weight on said scale.

91. The combination with a weighing scale having an indicator movable to different positions to indicate different weights, of mechanism for printing weights indicated by said indicator, and means for preventing operation of said printing mechanism if said indicator is displaced from zero position on the negative side thereof.

92. The combination with a weighing scale having an indicator movable to different positions to indicate different weights and register mechanism controlled by said indicator, of means for printing quantities registered by said mechanism, and means for preventing operation of said printing means when said registering mechanism is prevented from assuming zero position by displacement of said indicator.

93. The combination with a weighing scale, of registering mechanism therefor, means for retaining said registering mechanism away from zero position to permit oscillation of said weighing scale, means for printing quantities shown by said registering mechanism, and means for preventing operation of said printing means when said weighing scale is displaced from zero position on the side thereof to prevent said registering mechanism for assuming its zero position.

94. The combination with a weighing scale, of a rotary member for registering quantities indicated by said weighing scale, a stop arranged to cooperate with said weighing scale for controlling said rotary member, printing mechanism controlled by said rotary member, means for retaining said rotary member away from its zero position to free said scale from said stop, and means for preventing operation of said printing mechanism until said rotary member has been returned to its zero position.

95. The combination with a scale beam, of means for registering quantities indicated by said scale beam, mechanism for printing the quantities registered, a stop controlled by said scale beam for limiting the movement of said registering means, means for holding said stop away from its zero position to allow vibration of said scale beam, and means for preventing operation of said printing mechanism until said stop has been returned to its zero position.

96. The combination with a weighing scale, of registering mechanism therefor, means controlled by one portion of said scale for actuating said registering mechanism, means controlled by another portion of said scale for inserting quantities in said registering mechanism, and means for adjusting said first named means to register given amounts for different movements of its controlling part to adapt said registering mechanism to said scale.

97. The combination with a weighing scale, of registering mechanism therefor, said registering mechanism comprising a counter unit having means for carrying from one decimal order to another, said carrying means being adjustable to set the parts thereof for proper registration.

98. The combination with a weighing scale, of registering mechanism therefor, said registering mechanism comprising a counter unit having means for carrying from one decimal order to another, and separate means for inserting quantities into the decimal order to which quantities are carried, said carrying means being adjustable to set said registering mechanism for exact operation.

99. The combination with a weighing scale, of registering mechanism therefor, said mechanism comprising a counter unit having means for carrying from one decimal order to another, separate means for inserting quantities in said decimal order to which quantities are carried, means on said scale for controlling said counter unit, and separate means on said scale for controlling said quantity inserting means, said carrying means and said quantity inserting means being adjustable to set said register for exact operation.

100. The combination with a weighing scale having a member arranged to move amounts proportional to weights on said scale, a stop support connected with said movable member, a pair of adjustable stops carried by said stop support, and registering mechanism controlled by said stops.

101. The combination with a weighing scale having a movable member, of a stop support controlled by said member, registering mechanism, an actuator for said registering mechanism, a follower moved by said actuator, and a pair of adjustable stops on said stop support for limiting the movements of said actuator and said follower.

102. The combination with a weighing scale, of mechanism for registering a weight imposed upon said scale, said mechanism comprising a member graduated to register integral quantities, weight controlled means for positioning said member, means for truing said member to register the integral quantity nearest the quantity to which it is positioned by said weight controlled means, and fraction registering mechanism for registering a fractional part of an integral quantity when the quantity to which said member is trued is less by a predetermined minimum amount than the quantity represented by the position to which said graduated member is set by said weight controlled means.

103. Registering mechanism for weighing scales comprising a weight controlled graduated member for registering integral quantities, means for truing said member to register the integral quantity nearest the quantity to which it is set by said weight controlled means, and mechanism for registering a fractional part of an integral quantity for indicating approximately an excess of the quantity registered by said graduated member under the influence of said weight controlled means over the integral quantity to which said graduated member is trued.

104. Registering mechanism for weighing scales comprising a weight controlled graduated member for registering integral quantities, means for truing said member to the integral quantity nearest that quantity at which it is set by the controlling weight, and mechanism arranged for registering a fractional part of an integral quantity when said graduated member is trued to an integral number less by a predetermined minimum amount than the amount at which it is set by the controlling weight.

105. In a weighing scale, a movable weight controlled member, registering mechanism, a control device for said registering mechanism mounted on said weight controlled member, and means for counterbalancing said control device to prevent the weight thereof from affecting the movement of said weight controlled member.

In testimony whereof I have signed my name to this specification on this 2nd day of November, A. D. 1921.

OTTO MALCHER.